(12) United States Patent
Ross et al.

(10) Patent No.: US 11,795,786 B2
(45) Date of Patent: Oct. 24, 2023

(54) DOWNHOLE ENERGY HARVESTING

(71) Applicant: METROL TECHNOLOGY LTD, Aberdeen (GB)

(72) Inventors: Shaun Compton Ross, Aberdeen (GB); Leslie David Jarvis, Aberdeen (GB); Steven Martin Hudson, Aberdeen (GB)

(73) Assignee: METROL TECHNOLOGY LTD., Aberdeenshire (GB)

( * ) Notice: Subject to any disclaimer, the term of this patent is extended or adjusted under 35 U.S.C. 154(b) by 102 days.

(21) Appl. No.: 17/478,255

(22) Filed: Sep. 17, 2021

(65) Prior Publication Data

US 2022/0120161 A1 Apr. 21, 2022

Related U.S. Application Data

(63) Continuation of application No. 16/473,747, filed as application No. PCT/GB2016/054096 on Dec. 30, 2016, now Pat. No. 11,236,586.

(51) Int. Cl.
*E21B 17/00* (2006.01)
*E21B 41/00* (2006.01)
(Continued)

(52) U.S. Cl.
CPC ............ *E21B 41/02* (2013.01); *E21B 17/003* (2013.01); *E21B 34/066* (2013.01);
(Continued)

(58) Field of Classification Search
CPC .......................... E21B 41/0085; E21B 17/003
See application file for complete search history.

(56) References Cited

U.S. PATENT DOCUMENTS 6,469,635 B1   10/2002  Hudson
6,679,332 B2 *  1/2004  Vinegar ................. H04B 13/02
                                                166/373
(Continued)

FOREIGN PATENT DOCUMENTS

CN    101287888 A    10/2008
CN    103097645 A     5/2013
(Continued)

OTHER PUBLICATIONS

International Search Report for PCT/GB2016/054096 dated Jul. 4, 2017, 4 pages.
(Continued)

*Primary Examiner* — Shane Bomar
(74) *Attorney, Agent, or Firm* — Nixon & Vanderhye, PC

(57) ABSTRACT

Downhole electrical energy harvesting and communication in systems for well installations having metallic structure carrying electric current, for example CP current. In some instances there is a harvesting module (4) electrically connected to the metallic structure (2) at a first location and to a second location spaced from the first location, the first and second locations being chosen such that, in use, there is a potential difference therebetween due to the electric current flowing in the structure (2); and the harvesting module (4) being arranged to harvest electrical energy from the electric current. In addition or alternatively, there may be communication apparatus (4, 5, 6) for communication by modulation of the current, for example CP current, in the metallic structure (2).

28 Claims, 11 Drawing Sheets

(51) Int. Cl.

| | | |
|---|---|---|
| *E21B 41/02* | (2006.01) | |
| *E21B 47/13* | (2012.01) | |
| *E21B 34/06* | (2006.01) | |
| *E21B 47/06* | (2012.01) | |
| H02M 3/335 | (2006.01) | |
| E21B 47/12 | (2012.01) | |

(52) U.S. Cl.
CPC .......... *E21B 41/0085* (2013.01); *E21B 47/06* (2013.01); *E21B 47/13* (2020.05); E21B 47/12 (2013.01); H02M 3/33573 (2021.05)

(56) References Cited

U.S. PATENT DOCUMENTS

| | | | |
|---|---|---|---|
| 9,091,144 B2 | 7/2015 | Swanson et al. | |
| 9,316,063 B2 | 4/2016 | Gonzalez et al. | |
| 10,753,180 B2* | 8/2020 | San Martin | E21B 47/01 |
| 10,844,708 B2* | 11/2020 | Clawson | E21B 47/16 |
| 11,319,779 B1* | 5/2022 | Bryan | H10N 10/17 |
| 2002/0121366 A1 | 9/2002 | Bass et al. | |
| 2003/0042026 A1 | 3/2003 | Vinegar et al. | |
| 2005/0285753 A1 | 12/2005 | Shah et al. | |
| 2009/0038793 A1* | 2/2009 | Schmitt | E21B 47/125 166/250.01 |
| 2009/0078585 A1 | 3/2009 | Dwars et al. | |
| 2010/0133004 A1* | 6/2010 | Burleson | E21B 43/116 175/2 |
| 2010/0147349 A1 | 6/2010 | DiFoggio | |
| 2010/0206554 A1 | 8/2010 | Neuhaus et al. | |
| 2010/0308599 A1* | 12/2010 | Pabon | F03G 7/08 310/38 |
| 2011/0094752 A1* | 4/2011 | Hudson | E21B 47/12 166/373 |
| 2011/0170320 A1 | 7/2011 | Coenen et al. | |
| 2012/0152733 A1 | 6/2012 | Hanlon et al. | |
| 2013/0248169 A1 | 9/2013 | Swanson et al. | |
| 2013/0293029 A1 | 11/2013 | Hudson | |
| 2014/0069639 A1* | 3/2014 | Mackenzie | E21B 41/0085 166/250.01 |
| 2014/0218208 A1 | 8/2014 | Hudson | |
| 2014/0320301 A1 | 10/2014 | Hudson | |
| 2015/0252625 A1 | 9/2015 | Gonzalez et al. | |
| 2015/0267530 A1* | 9/2015 | Hudson | E21B 47/13 166/381 |
| 2018/0094519 A1 | 4/2018 | Stephens et al. | |
| 2018/0187520 A1* | 7/2018 | Mehta | H02N 2/18 |
| 2019/0323322 A1* | 10/2019 | Ross | E21B 34/066 |
| 2019/0353030 A1* | 11/2019 | Jarvis | E21B 41/02 |
| 2021/0123342 A1* | 4/2021 | Hudson | E21B 17/00 |
| 2021/0364716 A1* | 11/2021 | San Roman Alerigi | H10K 30/30 |
| 2021/0367129 A1* | 11/2021 | San Roman Alerigi | H04B 10/807 |

FOREIGN PATENT DOCUMENTS

| | | |
|---|---|---|
| EP | 2607617 | 6/2013 |
| GB | 2017306 | 10/1979 |
| GB | 2461065 | 12/2009 |
| GB | 2475731 | 6/2013 |
| WO | 2013/142786 | 9/2013 |
| WO | 2014/027106 | 2/2014 |
| WO | 2016/010517 | 1/2016 |

OTHER PUBLICATIONS

Written Opinion of the ISA for PCT/GB2016/054096 dated Jul. 4, 2017, 6 pages.
International Search Report for PCT/GB2016/054093, dated Jun. 19, 2017, 4 pages.
Written Opinion of the ISA for PCT/GB2016/054093, dated Jun. 19, 2017, 7 pages.
International Search Report for PCT/GB2016/054094, dated Jun. 19, 2017, 3 pages.
Written Opinion of the ISA for PCT/GB2016/054094, dated Jun. 19, 2017, 7 pages.
International Search Report for PCT/GB2016/054097 dated Sep. 1, 2017, 4 pages.
Written Opinion of the ISA for PCT/GB2016/054097 dated Sep. 1, 2017, 6 pages.
International Search Report for PCT/GB2016/054096 dated Sep. 1, 2017, 4 pages.
Written Opinion of the ISA for PCT/GB2016/054096 dated Sep. 1, 2017, 5 pages.
Chinese Search Report for Application No. 2016800921225 dated Mar. 29, 2021, 3 pages.
Chinese Search Report for Application No. 2016800921174 dated Apr. 12, 2021, 3 pages.
International Search Report for PCT/GB2016/054098 dated Sep. 1, 2017, 4 pages.
Written Opinion of the ISA for PCT/GB2016/054098 dated Sep. 1, 2017, 5 pages.

* cited by examiner

DOWNHOLE ENERGY HARVESTING

CROSS REFERENCE TO RELATED APPLICATIONS

This application is a continuation of U.S. application Ser. No. 16/473,747, filed on Jun. 26, 2019, which application is the U.S. national phase of International Application No. PCT/GB2016/054096 filed Dec. 30, 2016, the entire contents of each of which is hereby incorporated by reference.

FIELD OF THE INVENTION

This invention relates to downhole energy harvesting. In a particular case it relates to methods and systems for powering a downhole device in a well installation having metallic structure provided with cathodic protection. The invention also relates to methods and systems incorporating energy harvesting methods and systems as well as apparatus for use in such methods and systems.

BACKGROUND AND SUMMARY

There is a general desire to be able to extract data from oil and/or gas wells as well as control devices in oil and/or gas wells such as valves—say for example sub-surface safety valves.

However, providing power to such downhole devices represents a challenge. There are some circumstances where power may be provided directly from the surface via a cable or devices may be powered directly from the surface using hydraulic power. However, in other circumstances these methods of power delivery are not appropriate. In some circumstances the use of batteries becomes an option. However, this in itself represents challenges particularly in the downhole environment where the relatively high temperatures tend to lead to shortened battery life.

Therefore it is desirable to provide alternative sources of powering downhole devices which can be used in circumstances where the delivery of power directly from the surface via a cable or hydraulically is difficult, impossible or undesirable whilst avoiding the limitations which are encountered if battery power is relied upon. It is also desirable to provide alternative methods for communicating between downhole locations and other downhole and/or surface locations.

In the present specification the expression surface encompasses the land surface in a land well where a well head will be located, the seabed/mudline in a subsea well, and a well head deck on a platform. It also encompasses locations above these locations where appropriate. Generally "surface" is used to refer to any convenient location for applying and/or picking up power/signals for example, which is outside of the borehole of the well.

According to a first aspect of the invention there is provided a downhole electrical energy harvesting system for harvesting electrical energy in a well installation having metallic structure carrying electric current, the system comprising:
 a harvesting module electrically connected to the metallic structure at a first location and to a second location spaced from the first location, the first and second locations being chosen such that, in use, there is a potential difference therebetween due to the electric current flowing in the structure; and
 the harvesting module being arranged to harvest electrical energy from the electric current.

The well installation may be one with cathodic protection such that the electric current is cathodic protection current. Whilst the present techniques could be used in a system where current is specifically applied to the downhole structure for use in power delivery, it has been realised that it is possible to harvest power from cathodic protection systems and that is particularly preferred if the power can be harvested from currents which are already present.

The second location will generally be a downhole location.

In some instances the connection to the second location may be a connection to the formation via an electrode. Most typically however, the harvesting module will be connected to the metallic structure at the first and second spaced locations.

Such systems and methods are advantageous because power may be provided to a downhole device without having to provide a separate power supply. Moreover the power may be supplied without having to rely on local batteries which will tend to have a limited life and may be supplied without having to provide a cable which penetrates through the well head. Similarly these techniques may be implemented without using toroids to inject or extract signals. This reduces the complexity and technical issues which will be incurred in implementing a system.

The harvesting module may be arranged to harvest electrical energy from dc currents.

Preferably the current flow within portions of the metallic structure in regions between the first location and second location is in the same longitudinal direction.

Preferably there is an uninterrupted current flow path between the first location and the second location which is at least partly via the metallic structure.

These represent features which will generally be present in an installation unless modification is made to the set up. The present ideas generally do not need modifications to the standard set up of the well installation as a whole, that is they are aimed at working alongside a standard installation.

The harvesting module may be electrically connected to the metallic structure at the second location.

The or each connection to the metallic structure may be made to a run of metallic elongate members/a run of metallic pipe.

In one set of embodiments the spaced locations may be axially spaced. The connections may be made to a common run of metallic elongate members, for example a common run of metallic pipe which is part of the metallic structure. The uppermost of the two spaced locations may be adjacent to the location of a liner hanger provided in the well. Often this will represent the highest practical location for the uppermost location. In some instances the upper connection may be made to a riser.

Thus, for example the connections may both be made to production tubing provided in the well, or both made to a first run of casing separated by a first, "A", annulus from the production tubing, or both made to a second run of casing separated by a second, "B", annulus from the first run of casing, or so on.

In other cases, axially spaced connections may be made to different runs of metallic elongate members, for example different runs of metallic pipe with similar results, but it is generally more convenient to make the connections to the same run of metallic elongate members/metallic pipe if there is no reason to do differently.

Where the spaced locations are axially spaced and this is relied upon for there to be a potential difference therebetween, the spacing between the locations is likely to be considerable—typically 100 m or more. More preferably 300 m to 500 m.

The electrical connection to the metallic structure at the first location may be a galvanic connection.

The electrical connection to the metallic structure at the second location may be a galvanic connection.

The harvesting module may be positioned in one or more of external to the well elongate members, within an annulus of the well, and within an internal bore of the well.

The connection to at least one of the first and second locations may be via a cable running alongside the metallic structure.

Preferably if the second spaced contact is made to the at least one run of metallic elongate members then the electrical current flowing in the at least one run of metallic elongate members where the first contact is made flows in the same longitudinal direction as the electrical current flowing in the at least one run of metallic elongate members where the second contact is made.

Preferably if the first spaced contact and the second spaced contact are both made to the same run of metallic elongate members, that run of metallic elongate members is continuously conductive between the first and second locations.

At least one connection between the at least one of the electrical contacts and the harvesting module may be provided by an insulated cable.

The cable may be selected to have a conductor with a relatively large cross-sectional area. When selecting a cable the aim is to pick a cross-sectional area which is large enough to allow the desired level of harvesting—one which provides low enough resistance in the cable.

Preferably the insulated cable has a conductive area of at least 10 mm^2, preferably at least 20 mm^2, more preferably at least 80 mm^2.

The cable may be a tubing encapsulated conductor.

One of the connections may be made without an external cable. One of the connections may be made via a conductive housing of or surrounding the harvesting module.

Typically there will be an optimal spacing between the connections. The larger the spacing the greater the change in potential between the contact locations, but also the greater the resistance of the cable. The method may comprise determining an optimal spacing, between the spaced locations. This may be determined by modelling for a particular installation.

The spacing between the locations may be at least 100 m.

In another set of embodiments the spaced locations may be radially spaced. A first of the connections may be made to a first run of metallic elongate members, for example a first run metallic pipe which is part of the metallic structure and a second of the connections may be made to a second, distinct, run of metallic elongate members, for example, a second, distinct, run of metallic pipe which is part of the metallic structure. Thus the connection may be across an annulus defined by two runs of metallic pipe.

For example, one connection may be made to production tubing provided in the well and one to a first run of casing separated by a first, "A", annulus from the production tubing, or one connection may be made to a first run of casing provided in the well and one to a second run of casing separated by a second, "B", annulus from the first run of casing, and so on.

In some cases the spaced locations may be both axially spaced and radially spaced.

The connections may be made to a common run of metallic elongate members which is part of the metallic structure.

In some embodiments a first of the connections is made to a first run of metallic elongate members which is part of the metallic structure and a second of the connections is made to a second, distinct, run of metallic elongate members which is part of the metallic structure.

Insulation means may be provided for electrically insulating the first run of metallic elongate members from the second run of metallic elongate members in the region of the connections.

Insulation means may be provided for electrically insulating the first run of elongate members/metallic pipe from the second run of elongate members/metallic pipe in the region of at least one of the connections. This can help ensure that there is a potential difference between the runs of elongate members/metallic pipe at the locations where the connections are made. This being due to the different path to earth seen from each run of members/pipe.

Note that in the present techniques the currents from which energy is harvested will generally be flowing in the same direction in the first and second runs of metallic elongate members/pipe. Thus the insulation is not provided to form a separate return path but rather to alter the path to earth for one of the runs relative to the other.

The insulation means may comprise an insulation layer or coating provided on at least one of the runs of elongate members/metallic pipe. The insulation means may comprise at least one insulating centraliser for holding the runs of elongate members/metallic pipe apart from one another.

The insulation means may be provided to avoid electrical contact between the two runs of elongate members/metallic pipe for a distance of at least 100 m, preferably at least 300 m.

At least one of the connections may be located within the insulated region. Both of the connections may be located within the insulated region. At least one of the connections may be located towards a midpoint of the insulated region. The location of at least one of the connections may be determined by modelling of a particular installation to determine an optimum location which is then selected.

The harvesting module may be provided in the bore of a central run of tubing, in an annulus or outside the casing—between the casing and the formation. Thus amongst, other possible locations, the harvesting module may be provided in the "A" annulus, the "B" annulus, the "C" annulus, the "D" annulus, or any further annulus.

This gives rise to the possibility of providing power in locations where it is generally not possible and/or desirable to provide cables from the surface. This is particularly useful for subsea wells. Further this is possible without relying on the use of primary batteries or another local power source, and thus there is a possibility of providing "life of well" power in such locations.

The harvesting module may comprise variable impedance means for varying the load seen between the two connections. The variable impedance means may be microprocessor controlled.

The variable impedance means may be used to vary the load so as to optimise energy harvesting.

The variable impedance means may be used to modulate the load so as to communicate data from the harvesting module towards the surface.

Downhole communication means may be provided for transmitting data from downhole towards the surface. The downhole communication means may also be arranged for receiving data, for example from the surface.

The harvesting module may comprise downhole communication means. In other cases the downhole communication means may be provided separately. A downhole device which is powered by the harvesting module may comprise the downhole communication means.

The downhole communication means may comprise the variable impedance means.

Upper communication means may be provided at an out of bore hole location including a detector for detecting changes in the current, say the cathodic protection current, flowing in the metallic structure and hence allowing extraction of data encoded by modulation of the load at the harvesting module. For example the detector may be arranged to detect the potential of the metallic structure relative to a reference or to detect the potential seen across; or current seen by, a power supply used to apply an impressed cathodic protection current to the metallic structure.

In other embodiments rather than communicating towards the surface by modulating the load other communication techniques may be used. In general, for example, acoustic and/or EM (Electro-Magnetic) signalling may be used. Modulating the load is one example of EM signalling, but other, more direct means of EM signalling may be used.

The downhole communication means may be arranged to apply acoustic data carrying signals to the metallic structure and the upper communication means may be arranged to receive acoustic data carrying signals.

The downhole communication means may be arranged to apply EM (Electro-Magnetic) data carrying signals to the metallic structure and the upper communication means may be arranged to receive EM data carrying signals.

The upper communication means may be arranged to apply acoustic and/or EM (Electro-Magnetic) data carrying signals to the metallic structure, and the downhole communication means may be arranged to receive acoustic and/or EM data carrying signals.

In some cases the upper communication means and the downhole communication means may be arranged to communicate using both acoustic and EM signals. This creates useful redundancy in that if one communication channel fails the other may remain operational.

The harvesting module may be disposed at a selected location downhole for harvesting power and a cable may be provided for supplying electrical power further downhole to a downhole device. The cross sectional area of the cable used to supply the electrical power further downhole will typically be smaller than that of any cable used in harvesting the power, and typically the power will be supplied further downhole at a higher voltage than the voltage developed across the spaced contacts due to current flowing in the metallic structure, due for example to cathodic protection currents.

In some embodiments the current flowing in the elongate members is supplied from the surface of the well.

In some embodiments the current flowing in the elongate member is supplied from one or more sacrificial anodes.

In some embodiments the current flowing in the elongate members is an impressed current from an external power supply.

In some embodiments the voltage of the surface of the well is, in use, limited to the range minus 0.7 volts to minus 2 volts with respect to a silver/silver chloride reference cell.

Preferably the potential difference between the spaced contacts is less than 1 volt, preferably less than 0.5 volts, more preferably less than 0.1 volts.

Optionally the resistance of the well structure between the contacts is less than 0.1 ohms, preferably less than 0.01 ohms.

The optimal location for harvesting power will typically be near to the location at which the currents, for example, the cathodic protection currents are injected into the metallic structure.

Where the spaced locations are spaced axially, preferably the upper location is adjacent the location at which the currents, for example, the cathodic protection currents are injected into the metallic structure. Note that where there is a platform structure, the current, for example, the cathodic protection currents may reach the downhole metallic structure via a galvanic connection to the platform structure. In some cases the present techniques may include controlling the location of that connection.

The optimal location for harvesting power will often be near to the well head where there is the greatest rate of change in potential as one progresses down into the well. On the other hand a downhole device to be powered may be further downhole. Thus the harvesting module and downhole device may be at different locations, in particular, different depths in the well.

In other situations, the harvesting module and downhole device may be located together. The system may comprise a downhole unit which comprises the harvesting module and the downhole device.

The upper spaced contact may be:
where the well is a land well, within 100 m, preferably within 50 m of the land surface; and
where the well is a subsea well, within 100 m, preferably within 50 m of the mudline.

The upper spaced contact may be located adjacent to a location which corresponds to a maxima in magnitude of potential caused by the electric current flowing in the structure.

The system may further comprise downhole communication means for transmitting and/or receiving data.

The downhole communication means may be arranged for transmitting data by varying the load seen between the connections at the spaced locations.

According to another aspect of the invention there is provided a downhole device operation system comprising a downhole electrical energy harvesting system as defined above and a downhole device, the harvesting module being electrically connected to and arranged for providing power to the downhole device.

The downhole device may comprise a downhole sensor for example a pressure and/or temperature sensor. The sensor may be installed, for example, in the "A", "B", "C" or "D" annulus.

A sensor disposed in one annulus or bore may be arranged to monitor a parameter in an adjacent annulus or bore as well as or instead of in the annulus or bore in which it is located. A port may be provided through a run of metallic structure to allow sensing in an adjacent annulus or bore.

A sensor may be provided for detecting a leak in a cemented annulus.

A sensor may comprise an array of sensors.

The downhole device may comprise at least one of:
a downhole sensor;
a downhole actuator;
an annular sealing device, for example a packer, or a packer element;

a valve;
a downhole communication module, for example a transceiver or repeater.

The communication module may comprise a downhole communications repeater. This may be a repeater for acoustic communication, or EM communication including wireless EM communication and cable borne EM communication, or for a hybrid communication system. For example, the repeater may receive acoustic signals from further downhole and signal towards the surface using EM communication or vice versa. Similarly both acoustic and EM communication may be used in one or both directions. EM signalling may be achieved by applying electrical signals downhole or modulating the load in the harvesting module as described above. EM signalling may be at least partly along cables as mentioned above.

Where the downhole device is a repeater or a transceiver, the system may be pre-installed in a well installation to make the well "wireless ready". That is, the system may be installed to provide a wireless communication backbone even though the communication ability may not be used initially. Here again wireless refers to there being at least one wireless leg in the communication channel, other legs may be via cable.

In other situations the system may be retro-fitted.

The valve may comprise at least one of:
a subsurface safety valve;
a bore flow control valve;
a bore to annulus valve;
an annulus to annulus valve;
a bore to pressure compensation chamber valve;
an annulus to pressure compensation chamber valve;
a through packer or packer bypass valve.

Note that each device may be a remotely controlled device which may be a wirelessly controlled device, for example in the sense that where controlled from the surface there is at least one wireless leg in the communications channel. Other legs may be via cable e.g. between a sensor location and the harvesting location.

EM signalling may be using dc or ac signals and appropriate modulation schemes. The harvesting module may comprise a dc to dc convertor for harvesting power from the cathodic protection currents or other current present. The harvesting module may comprise an energy storage device for storing harvested power. The energy storage device may comprise a charge storage device which may comprise at least one capacitor and/or at least one re-chargeable battery. Where there is energy storage means, the harvesting module may be arranged to selectively supply power from the storage device or directly from harvested energy. This selection may be made based on predetermined conditions. Alternatively there may be no energy storage device and the harvesting module may be arranged to supply power continuously when required.

A primary battery may also be provided at the harvesting module for selective use.

The dc to dc converter may comprise a Field Effect Transistor arranged to form a resonant step-up oscillator. The dc to dc convertor may include a step-up transformer and may include a coupling capacitor.

The harvesting module may be arranged to control the turns ratio of the step-up transformer to modify the load generated by the dc-dc converter. A secondary winding of the step-up transformer may comprise a plurality of tappings and/or the step-up transformer may comprise a plurality of secondary windings and the harvesting module may be arranged to select windings and/or tappings to provide a desired turns ratio. A microprocessor controlled switch may be used to select tappings and/or windings.

According to another aspect there is provided a downhole unit comprising a harvesting module as defined above and at least one device arranged to be powered by the harvesting module.

One or more of the sensor module, the communication module, and the harvesting module may be provided in an annulus—for example the "B" annulus or the "C" annulus or another annulus. The sensor module and the harvesting module may be provided as part of a common downhole unit, however more typically they will be separate so that the sensor may be located deeper than the harvesting module.

The downhole device may be provided at a different location in the well than the harvesting module.

The harvesting module may be disposed at a selected location downhole for harvesting power and a cable may be provided for supplying electrical power further downhole to the downhole device at a different location in the well.

The cross sectional area of the conductive core, or cores, of the cable used to supply the electrical power further downhole may be smaller than that of cable used to connect the harvesting module to the downhole structure for harvesting the power.

According to another aspect of the invention there is provided a downhole well monitoring system for monitoring at least one parameter in a well installation having metallic structure carrying electric current, the system comprising:
an electrical energy harvesting system as defined above;
a sensor module for sensing at least one parameter; and a communication module for sending data encoding readings from the sensor module towards the surface,
the electrical energy harvesting system being arranged to supply electrical power to at least one of the sensor module and the communications module.

According to another aspect of the invention there is provided a downhole well monitoring system for monitoring at least one parameter in a well installation having metallic structure carrying electric current, the system comprising:
a sensor module for sensing at least one parameter;
a communication module for sending data encoding readings from the sensor module towards the surface; and
an electrical energy harvesting system comprising a harvesting module electrically connected to the metallic structure at a first location and to a second location spaced from the first location, the first and second locations being chosen such that, in use, there is a potential difference therebetween due to the electric current flowing in the structure; and the harvesting module being arranged to harvest electrical energy from the electric current, the electrical energy harvesting system being arranged to supply electrical power to at least one of the sensor module and the communications module.

The system may comprise at least one first length of cable for connecting the harvesting module to one of the spaced locations.

The system may comprise at least one second length of cable for supplying power from the harvesting module to the sensor module.

The cross-sectional area of the conducting portion of the first length of cable may be greater than the cross-sectional area of the conducting portion of the second length of cable.

The communication module may be arranged for modulating the electric current flowing in the metallic structure at a signalling location so as to encode data to allow extraction of the data at a reception location remote from the signalling location by detection of the effect of said modulation on the electric current at said reception location.

The well monitoring system may comprise a detector for detecting the effect of said modulation on the electric current at said reception location to extract the encoded data.

The communication module may be arranged for controlling the load generated by the harvesting module to cause said modulation of the electric current in the metallic structure at the signalling location.

The sensor module may comprise a pressure sensor.

The pressure sensor may be arranged for monitoring the reservoir pressure of the well.

The pressure sensor may be arranged for monitoring the pressure in an annulus of the well.

The pressure sensor may be arranged for monitoring the pressure in an enclosed annulus of the well.

According to another aspect of the invention there is provided a downhole communication repeater system for use in a well installation having metallic structure carrying electric current, the system comprising:
  an electrical energy harvesting system as defined above; and
  a communications repeater disposed downhole in the well and arranged for communicating with a first device beyond the well head using a communication channel which is wireless at least through the well head and arranged for communicating with second device located in the well and thus below the well head such that the communications repeater may act as a repeater between the first and second devices,
  the electrical energy harvesting system being arranged to supply electrical power to communications repeater.

According to another aspect of the invention there is provided a downhole communication repeater system for use in a well installation having metallic structure carrying electric current, the system comprising:
  a communications repeater disposed downhole in the well and arranged for communicating with a first device beyond the well head using a communication channel which is wireless at least through the well head and arranged for communicating with second device located in the well and thus below the well head such that the communications repeater may act as a repeater between the first and second devices; and
  an electrical energy harvesting system comprising a harvesting module electrically connected to the metallic structure at a first location and to a second location spaced from the first location, the first and second locations being chosen such that, in use, there is a potential difference therebetween due to the electric current flowing in the structure; and the harvesting module being arranged to harvest electrical energy from the electric current,
  the electrical energy harvesting system being arranged to supply electrical power to communications repeater.

It will be appreciated that here reference to a first device beyond the well head refers to one on the other side of the well head than the second device which is in the well such that communication across the well head is desired. Ultimately, the first device could be located almost anywhere, be that close to the well head or at a remote location, provided that appropriate communications are provided.

The communications repeater may be arranged for modulating the electric current flowing in the metallic structure at a signalling location so as to encode data to allow extraction of the data at a reception location remote from the signalling location by detection of the effect of said modulation on the electric current at said reception location.

The communications repeater and/or the harvesting module may be provided in an annulus—for example the "B" annulus or the "C" annulus or another annulus.

The communications repeater and the harvesting module may be provided as part of a common downhole unit.

The system may comprise at least one first length of cable for connecting the harvesting module to one of the spaced locations.

The system may comprise at least one second length of cable for supplying power from the harvesting module to the communications repeater.

The cross-sectional area of the conducting portion of the first length of cable may be greater than the cross-sectional area of the conducting portion of the second length of cable.

The downhole communication repeater system may comprise a detector for detecting the effect of said modulation on the electric current at said reception location to extract the encoded data.

The communications repeater may be arranged for controlling the load generated by the harvesting module to cause said modulation of the electric current in the metallic structure at the signalling location.

According to another aspect of the present invention there is provided a downhole device operation system for operating a downhole device in a well installation having metallic structure carrying electric current, the system comprising:
  a downhole device;
  an electrical energy harvesting system comprising a harvesting module electrically connected to the metallic structure at a first location and to a second location spaced from the first location, the first and second locations being chosen such that, in use, there is a potential difference therebetween due to the electric current flowing in the structure; and the harvesting module being arranged to harvest electrical energy from the electric current, the electrical energy harvesting system being arranged to supply electrical power to the downhole device.

The downhole device may comprise at least one of:
  a downhole sensor;
  a downhole actuator;
  an annular sealing device, for example a packer, or a packer element; a valve;
  a downhole communication module, for example a transceiver or repeater.

The valve may comprise at least one of:
  a subsurface safety valve;
  a bore flow control valve;
  a bore to annulus valve;
  an annulus to annulus valve;
  a bore to pressure compensation chamber valve;
  an annulus to pressure compensation chamber valve;
  a through packer or packer bypass valve.

The power may be supplied to control the valve, with power for moving the valve coming from another source (e.g. spring loading, differential pressure), or supplied for moving the valve or for control and moving of the valve. The valve may comprise a trigger mechanism for example a pilot valve that is operated using power from the power delivery system.

The device operating system may be arranged to supply variable power levels. Thus a first power level may be provided other than at times when a second higher power level is required. The applied currents, for example the cathodic protection currents may be increased when the higher power level is required by switching in more anodes or applying a higher impressed current. This might be at a level which is undesirable long term due to the potentially damaging effects of too high a potential difference caused by the cathodic protection currents—hydrogen embrittlement—but acceptable short term. Thus the system, apparatus, method may be arranged for temporarily increasing the applied current, for example the cathodic protections current. The higher power level may be used for example to move a valve from one state to another, with the lower level used at other times, for example monitoring and/or control signals.

The downhole device may be provided at a different location in the well than the harvesting module.

The harvesting module may be disposed at a selected location downhole for harvesting power and a cable may be provided for supplying electrical power further downhole to the downhole device at a different location in the well.

The cross sectional area of the conductive core, or cores, of the cable used to supply the electrical power further downhole may be smaller than that of cable used to connect the harvesting module to the downhole structure for harvesting the power.

A further source of power may be available to the downhole device besides electrical power supplied by the electrical energy harvesting module.

In each of the above apparatus, the harvesting module may comprise variable impedance means for varying the load seen between the two connections. The variable impedance means may be microprocessor controlled.

The variable impedance means may be used to vary the load so as to optimise energy harvesting.

The variable impedance means may be used to modulate the load so as to communicate data from the harvesting module towards the surface.

Impedance modulation may also be used in communicating from an upper location towards the harvesting module so as to modulate the applied (e.g. cathodic protection) current. One possibility is to switch an anode into and out of operation which will modulate the potential seen downhole. Thus data may be encoded by switching the anode into and out of operation. For example the connection between the anode and the structure may be selectively made and broken with switch means. Thus the upper communication unit may comprise a switch means for switching an anode into and out of operation. In an impressed current system the applied signals may be modulated to encode data.

According to another aspect of the present invention there is provided a method of powering a downhole device in a well installation having metallic structure carrying electric current, the method comprising the steps of:

electrically connecting a harvesting unit to the metallic structure at a first location and to a second location spaced from the first location, the first and second locations being chosen such that there is a potential difference therebetween due to the electric current flowing in the structure and the harvesting unit being arranged to harvest electrical energy from electric current when connected between locations having a potential difference therebetween;

harvesting electrical power from the electric current at the harvesting unit; and supplying electrical power from the harvesting unit to the downhole device.

The method may comprise the steps of: determining a location where there is a maxima in magnitude of potential caused by the electric current flowing in the structure, and choosing the first location, where the harvesting unit is connected to the metallic structure, in dependence on the location of said maxima.

According to another aspect of the present invention there is provided a downhole electrical energy harvesting system for use in a well installation having metallic structure comprising at least one run of metallic elongate members carrying electrical current, the harvesting system comprising: an energy harvesting module comprising an electrical circuit connected between spaced contacts to harvest energy from a potential difference between the spaced contacts, wherein a first of the spaced contacts is made to the at least one run of metallic elongate members at a first location and a second of the spaced contacts is made to the at least one run of metallic elongate members at a second location and the potential difference is caused by the current flowing in the at least one run of elongate members and, at least in part, the impedance of the at least one run of elongate members.

The electrical current flowing in the at least one run of metallic elongate members where the first contact is made may flow in the same longitudinal direction as the electrical current flowing in the at least one run of metallic elongate members where the second contact is made.

Preferably if the first spaced contact and the second spaced contact are both made to the same run of metallic elongate members, that run of metallic elongate members is continuously conductive between the first and second locations.

Preferably the metallic structure provides an uninterrupted current flow path between the first location and the second location.

Preferably the current flow within portions of the metallic structure in regions between the first location and second location is in the same longitudinal direction.

Preferably the harvesting module is arranged to harvest electrical energy from dc currents.

The electrical connection to the metallic structure at the first location may be a galvanic connection.

The electrical connection to the metallic structure at the second location may be a galvanic connection.

The electrical connection to the metallic structure at the first location may be made to one of: casing, liner, tubing, coiled tubing, sucker rod.

The electrical connection to the metallic structure at the second location may be made to one of: casing, liner, tubing, coiled tubing, sucker rod.

The spaced locations may be axially spaced.

The spaced locations may be radially spaced.

At least one connection between the at least one of the electrical contacts and the electrical circuit may be provided by an insulated cable.

Preferably the insulated cable has a conductive area of at least 10 mm^2, preferably at least 20 mm^2, more preferably at least 80 mm^2.

The cable may be a tubing encapsulated conductor.

The spacing between the locations may be at least 100 m.

The connections may be made to a common run of metallic elongate members which is part of the metallic structure.

In some embodiments a first of the connections is made to a first run of metallic elongate members which is part of the metallic structure and a second of the connections is made to a second, distinct, run of metallic elongate members which is part of the metallic structure.

Insulation means may be provided for electrically insulating the first run of metallic elongate members from the second run of metallic elongate members in the region of the connections.

The insulation means may comprise an insulation layer or coating provided on at least one of the runs of metallic elongate members.

The insulation means may comprise at least one insulating centraliser for holding the runs of metallic elongate members apart from one another.

The insulation means may be provided to avoid electrical contact between the two runs of metallic elongate members for a distance of at least 100 m.

The current flowing in the elongate members may be supplied from the surface of the well.

The current flowing in the elongate member may be supplied from one or more sacrificial anodes.

The current flowing in the elongate members may be an impressed current from an external power supply.

The voltage of the surface of the well may be, in use, limited to the range minus 0.7 volts to minus 2 volts with respect to a silver/silver chloride reference cell.

The potential difference between the spaced contacts may be less than 1 volt, preferably less than 0.5 volts, more preferably less than 0.1 volts.

The resistance of the well structure between the contacts may be less than 0.1 ohms, preferably less than 0.01 ohms.

The upper spaced contact may be:
where the well is a land well, within 100 m, preferably within 50 m of the land surface; and
where the well is a subsea well, within 100 m, preferably within 50 m of the mudline.

The upper spaced contact may be located adjacent to a location which corresponds to a maxima in magnitude of potential caused by the electric current flowing in the structure.

The system may comprise downhole communication means for transmitting and/or receiving data.

The downhole communication means may be arranged for transmitting data by varying the load seen between the connections at the spaced locations.

According to another aspect of the invention there is provided a downhole device operation system comprising a downhole electrical energy harvesting system defined above and a downhole device, the harvesting module being electrically connected to and arranged for providing power to the downhole device.

The downhole device may comprise at least one of:
a downhole sensor;
a downhole actuator;
an annular sealing device, for example a packer, or a packer element;
a valve;
a downhole communication module, for example a transceiver or repeater.

The valve may comprise at least one of:
a subsurface safety valve;
a bore flow control valve;
a bore to annulus valve;
an annulus to annulus valve;
a bore to pressure compensation chamber valve;
an annulus to pressure compensation chamber valve;
a through packer or packer bypass valve.

The downhole device may be provided at a different location in the well than the harvesting module.

The harvesting module may be disposed at a selected location downhole for harvesting power and a cable may be provided for supplying electrical power further downhole to the downhole device at a different location in the well.

The cross sectional area of the conductive core, or cores, of the cable used to supply the electrical power further downhole may be smaller than that of cable used to connect the harvesting module to the downhole structure for harvesting the power.

According to another aspect of the present invention there is provided a method of powering a downhole device in a well installation having metallic structure carrying electric current, the method comprising the steps of:
electrically connecting a harvesting unit to the metallic structure at a first location and to the metallic structure at a second location spaced from the first location, the first and second locations being chosen such that there is a potential difference therebetween due to the electric current flowing in the structure and the harvesting unit being arranged to harvest electrical energy from electric current when connected between locations having a potential difference therebetween;
harvesting electrical power from the electric current at the harvesting unit; and supplying electrical power from the harvesting unit to the downhole device.

The method may comprise the further steps of: determining a location where there is a maxima in magnitude of potential caused by the electric current flowing in the structure, and choosing the first location, where the harvesting unit is connected to the metallic structure, in dependence on the location of said maxima.

According to another aspect of the present invention there is provided a downhole electrical energy harvesting system for harvesting electrical energy in a well installation having metallic structure provided with cathodic protection, the system comprising:
a harvesting module electrically connected to the metallic structure at a first location and to a second location spaced from the first location, the first and second locations being chosen such that, in use, there is a potential difference therebetween due to the cathodic protection currents flowing in the structure; and
the harvesting module being arranged to harvest electrical energy from the cathodic protection currents.

The harvesting module may be arranged to harvest electrical energy from dc currents.

The current flow within portions of the metallic structure in regions between the first location and second location may be in the same longitudinal direction.

There may be an uninterrupted current flow path between the first location and the second location which is at least partly via the metallic structure.

The harvesting module may be electrically connected to the metallic structure at the second location.

The spaced locations may be axially spaced.
The spaced locations may be radially spaced.

At least one connection between the at least one of the electrical contacts and the harvesting module may be provided by an insulated cable.

The insulated cable may be a conductive area of at least 10 mm^2, preferably at least 20 mm^2, more preferably at least 80 mm^2.

The cable may be a tubing encapsulated conductor.
The spacing between the locations may be at least 100 m.
The connections may be made to a common run of metallic elongate members which is part of the metallic structure.

A first of the connections may be made to a first run of metallic elongate members which is part of the metallic structure and a second of the connections may be made to a second, distinct, run of metallic elongate members which is part of the metallic structure.

Insulation means may be provided for electrically insulating the first run of metallic elongate members from the second run of metallic elongate members in the region of the connections.

The insulation means may comprise an insulation layer or coating provided on at least one of the runs of metallic elongate members.

The insulation means may comprise at least one insulating centraliser for holding the runs of metallic elongate members apart from one another.

The insulation means may be provided to avoid electrical contact between the two runs of metallic elongate members for a distance of at least 100 m.

The current flowing in the elongate members may be supplied from the surface of the well.

The current flowing in the elongate member may be supplied from one or more sacrificial anodes.

The current flowing in the elongate members may be an impressed current from an external power supply.

The voltage of the surface of the well may be, in use, limited to the range minus 0.7 volts to minus 2 volts with respect to a silver/silver chloride reference cell.

The potential difference between the spaced contacts may be less than 1 volt, preferably less than 0.5 volts, more preferably less than 0.1 volts.

The resistance of the well structure between the contacts may be less than 0.1 ohms, preferably less than 0.01 ohms.

The upper spaced contact may be:
where the well is a land well, within 100 m, preferably within 50 m of the land surface; and
where the well is a subsea well, within 100 m, preferably within 50 m of the mudline.

The upper spaced contact may be located adjacent to a location which corresponds to a maxima in magnitude of potential caused by the electric current flowing in the structure.

The system may further comprise downhole communication means for transmitting and/or receiving data.

The downhole communication means may be arranged for transmitting data by varying the load seen between the connections at the spaced locations.

According to another aspect of the present invention there is provided a downhole device operation system comprising a downhole electrical energy harvesting system as defined above and a downhole device, the harvesting module being electrically connected to and arranged for providing power to the downhole device.

The downhole device may comprise at least one of:
a downhole sensor;
a downhole actuator;
an annular sealing device, for example a packer, or a packer element;
a valve;
a downhole communication module, for example a transceiver or repeater.

The valve may comprise at least one of:
a subsurface safety valve;
a bore flow control valve;
a bore to annulus valve;
an annulus to annulus valve;
a bore to pressure compensation chamber valve;
an annulus to pressure compensation chamber valve;
a through packer or packer bypass valve.

The downhole device may be provided at a different location in the well than the harvesting module.

The harvesting module may be disposed at a selected location downhole for harvesting power and a cable may be provided for supplying electrical power further downhole to the downhole device at a different location in the well.

The cross sectional area of the conductive core, or cores, of the cable used to supply the electrical power further downhole may be smaller than that of cable used to connect the harvesting module to the downhole structure for harvesting the power.

According to another aspect of the present invention there is provided downhole data communication apparatus for use in a well installation having metallic structure provided with a cathodic protection system such that there is an electrical circuit comprising the metallic structure and an earth return around which an electrical current flows as a result of the cathodic protection system, the downhole data communication apparatus comprising:
a first communication module for location at a first location and comprising modulation means for modulating the electrical current at a first location so as to encode data; and
a second communication module for location at a second location, spaced from the first location, and comprising a detector for detecting the effect of the modulation of the electrical current at the first location so as to extract said data.

The modulation means may be arranged to at least one of:
i) where the cathodic protection system is an impressed cathodic protection system, control a signal source of the impressed cathodic protection system to directly modulate the cathodic protection current applied to the metallic structure;
ii) modify the connection between at least one anode of the cathodic protection system and the metallic structure; and
iii) alter the impedance of the electrical circuit.

The first communication module may be arranged for location downhole.

The second communication module may be arranged for location downhole.

The apparatus may comprise a sensor module for sensing at least one parameter, wherein the first communication module is arranged for sending data encoding readings from the sensor module towards the second communication module.

The sensor module may comprise a pressure sensor.

The second communication module may be arranged for providing data to a downhole device in dependence on data received by the second communication module from the first communication module.

The downhole device may comprise at least one of:
a downhole sensor;
a downhole actuator;
an annular sealing device, for example a packer, or a packer element;
a valve;
a downhole communication module, for example a transceiver or repeater.

The valve may comprise at least one of:
a subsurface safety valve;
a bore flow control valve;
a bore to annulus valve;
an annulus to annulus valve;
a bore to pressure compensation chamber valve;
an annulus to pressure compensation chamber valve;

a through packer or packer bypass valve.

At least one of the first and second communication modules may comprise a communications repeater for location downhole in a well and arranged for communicating with a first device beyond the well head using a communication channel which is wireless at least through the well head and arranged for communicating with second device located in the well and thus below the well head such that the communications repeater may act as a repeater between the first and second devices.

The apparatus may comprise a downhole electrical power harvesting module arranged for electrical connection between two spaced locations in a well installation and comprising an electrical circuit arranged for harvesting electrical energy, in use, from a potential difference between the spaced locations, used for harvesting, which acts as an input voltage, the harvesting module being arranged for supplying power to at least one component of the communication apparatus.

The first communication module may be arranged for controlling the load generated by the harvesting module to cause said modulation of the electric current in the metallic structure at the signalling location.

The harvesting module may be arranged to harvest electrical energy from dc currents.

According to another aspect of the present invention there is provided a downhole data communication system comprising downhole data communication apparatus as defined above located in a well installation having metallic structure provided with cathodic protection.

According to another aspect of the present invention there is provided a downhole data communication system for use in a well installation having metallic structure provided with a cathodic protection system such that there is an electrical circuit comprising the metallic structure and an earth return around which an electrical current flows as a result of the cathodic protection system, the system comprising downhole data communication apparatus comprising:
  a first communication module located at a first location and comprising modulation means for modulating the electrical current at the first location so as to encode data; and
  a second communication module located at a second location, spaced from the first location, and comprising a detector for detecting the effect of the modulation of the electrical current at the first location so as to extract said data.

The apparatus may comprise a downhole electrical power harvesting module electrically connected between two spaced locations in the well installation and comprising an electrical circuit arranged for harvesting electrical energy, in use, from a potential difference between the spaced locations, used for harvesting, which acts as an input voltage, the harvesting module being arranged for supplying power to at least one component of the communication apparatus.

The current flow within portions of the metallic structure in regions between the spaced locations, used for harvesting, may be in the same longitudinal direction.

There may be an uninterrupted current flow path between the spaced locations, used for harvesting, which is at least partly via the metallic structure.

At least one of the first communication module and the second communication module may be located in an enclosed annulus of the well.

The system or apparatus may comprise a pressure sensor arranged for monitoring the reservoir pressure of the well.

The system or apparatus may comprise a pressure sensor arranged for monitoring the pressure in an annulus of the well.

The system or apparatus may comprise a pressure sensor arranged for monitoring the pressure in an enclosed annulus of the well.

According to another aspect of the present invention there is provided a downhole electrical power harvesting module arranged for electrical connection between two spaced locations in a well installation and comprising an electrical circuit arranged for harvesting electrical energy, in use, from a potential difference between the spaced locations which acts as an input voltage.

The harvesting module may be arranged to harvest electrical energy from dc currents.

The harvesting module may comprise control means for modifying the input impedance of the electrical circuit to match the source impedance of the electrical circuit to optimise power conversion efficiency.

The electrical circuit may comprise a dc-dc convertor.

The dc-dc convertor may be arranged to operate with input voltages above a minimum threshold, wherein the minimum threshold is not greater than 0.5 volt, preferably the minimum threshold is not greater than 0.25 volts, and more preferably the minimum threshold is not greater than 0.05 volts.

The dc-dc converter may comprise self-start means to allow initiation of energy harvesting when the available input voltage is below a semiconductor band gap voltage of components in the dc-dc convertor.

The dc-dc converter may comprise self-start means to allow initiation of energy harvesting when the available input voltage is below 0.5 volts.

The dc to dc converter may comprise a step-up transformer.

The self-start means may comprise a Field Effect Transistor arranged together with the step-up transformer to form a resonant step-up oscillator.

The dc-dc convertor may comprise an H bridge of transistors arranged under the control of control means for providing an input to the step up transformer and the self-start means may comprise an auxiliary source of power for the control means for allowing start up.

The harvesting module may comprise control means arranged to control the turns ratio of the step-up transformer to modify the load generated by the dc-dc converter.

A secondary winding of the step-up transformer may comprise a plurality of tappings and/or the step-up transformer may comprise a plurality of secondary windings and the control means may be arranged to select windings and/or tappings to provide a desired turns ratio.

The harvesting module may comprise at least a pair of terminals from which connection to the two spaced locations may be made.

The harvesting module may have more than two terminals, wherein each of the terminals is for allowing connection to a respective location and the harvesting module may further comprise switch means for selectively electrically connecting two of the terminals across the electrical circuit so allowing selection of which of the respective locations the electrical circuit is connected between.

This allows a set up where multiple contacts to the metallic structure may be made during installation and after installation a selection is made as to which contacts should be used. Thus for example the set up may include one lower connection and two upper connections at different locations. Once installed it may be determined that greater power can be harvested if a first of the upper connections is used so this first connection may be used. In another case the second upper connection may be better.

The switch might also be used dynamically in use to switch between connections.

In another case there might be two lower connections as well as or instead of two upper connections, or there may be other numbers of upper and/or lower connections.

The harvesting module may comprise an energy storage device for storing harvested power. The energy storage device may comprise a charge storage device which may comprise at least one capacitor and/or re-chargeable battery.

The harvesting module may comprise variable impedance means for varying the load seen between the two connections.

The variable impedance means may be microprocessor controlled.

The harvesting module may be arranged to use the variable impedance means to vary the load so as to optimise energy harvesting.

The harvesting module may be arranged to use the variable impedance means to modulate the load so as to communicate data away from the harvesting module.

The harvesting module may comprise a primary battery such that in use power may be selectively drawn from the power harvested by the circuit and from the primary battery.

According to another aspect of the present invention there is provided downhole apparatus comprising a harvesting module as defined above and a downhole device to accept power from the harvesting module.

The downhole apparatus may comprise charge storage means and power control means to control power to the downhole device when sufficient energy is available to power the device.

The downhole apparatus may comprise impedance modulation means for varying the input impedance of the harvesting module to modulate the load so as to transmit data from at least one of the electrical power harvesting unit and the downhole device.

The downhole apparatus may comprise modulation means for applying a modulated voltage via the spaced connections so as to transmit data.

The downhole apparatus may comprise a primary battery such that in use power may be selectively drawn from the harvested power and from the primary battery.

The downhole device of the downhole apparatus may comprise at least one of:
 a downhole sensor;
 a downhole actuator;
 an annular sealing device, for example a packer, or a packer element;
 a valve;
 a downhole communication module, for example a transceiver or repeater.

The valve may comprise at least one of:
 a subsurface safety valve;
 a bore flow control valve;
 a bore to annulus valve;
 an annulus to annulus valve;
 a bore to pressure compensation chamber valve;
 an annulus to pressure compensation chamber valve;
 a through packer or packer bypass valve.

According to another aspect of the present invention there is provided a downhole electrical energy harvesting system for harvesting electrical energy in a well installation having metallic structure carrying electric current, the system comprising:
 a harvesting module as defined above electrically connected to the metallic structure at a first location and to a second location spaced from the first location, the first and second locations being chosen such that, in use, there is a potential difference therebetween due to the electric current flowing in the structure; and
 the harvesting module being arranged to harvest electrical energy from the electric current.

According to another aspect of the invention there is provided a downhole power delivery system for powering a downhole device in a well installation having metallic structure carrying electric current, the system comprising:
 a harvesting module as defined above electrically connected to the metallic structure at a first location and to a second location spaced from the first location, the first and second locations being chosen such that, in use, there is a potential difference therebetween due to the electric current flowing in the structure; and
 the harvesting module being arranged to harvest electrical power from the electric current and supply electrical power to the downhole device.

According to a yet another aspect of the invention there is provided a downhole power delivery system for powering a downhole device in a well installation having metallic structure provided with cathodic protection, the system comprising:
 a harvesting module as defined above electrically connected to the metallic structure at two spaced locations chosen such that, in use, there is a potential difference therebetween due to cathodic protection currents flowing in the structure; and
 the harvesting module being arranged to harvest electrical power from the cathodic protection currents and supply electrical power to the downhole device.

According to a further aspect of the invention there is provided a method of data communication in a well installation having metallic structure provided with a cathodic protection system such that there is an electrical circuit comprising the metallic structure and an earth return around which electrical current flows as a result of the cathodic protection system, the method comprising the steps of:
 modulating the electrical current at a first location to so as to encode data; and detecting at a second location, spaced from the first, the effect of the modulation of the electrical current at the first location so as to extract said data.

One of the locations may be at an out of bore hole location, say, the surface, another of the locations may be downhole.

The step of modulating the current may, amongst other things, comprise and the modulation means may, amongst other things, be arranged to:
 i) where the cathodic protection system is an impressed cathodic protection system, control a signal source of the impressed cathodic protection system to directly modulate the cathodic protection signals applied to the metallic structure; or
 ii) modify the connection between at least one anode and the metallic structure—thus at least one anode may, for example, be switched into and out of connection with the metallic structure to modulate the electrical signals or the impedance between the anode and the structure may be varied; or
 iii) alter the impedance of the electrical circuit—this may, for example, be achieved using a variable impedance means, or by switching components into and out of connection with the circuit.

Techniques i) and ii) are likely to only be available at an upper location, whereas technique iii) is likely to be available downhole and at an upper location.

Communication using this overall idea can be used for one way, say, surface to downhole communication, one way, say, downhole to surface communication and two way communication.

These techniques enable communication as part of a hybrid communication system—i.e. where some parts of the signal channel are provided by modulating the cathodic protection signals and some by other techniques, such as other wireless techniques including other EM techniques and acoustic techniques.

In each case above the cathodic protection where present may be provided by a passive cathodic protection system where sacrificial anodes are connected to metallic structure of the well installation or by an impressed cathodic protection system where a protective current is applied to metallic structure of the well installation.

In the present methods and systems the aim is to make use of existing cathodic protection systems (or other sources of current if available), in particular to make use of existing anodes where present in say subsea installations and without requiring modification thereto. Thus anodes where present will typically be outside, that is above, the bore hole and located in water. Furthermore the anodes will typically be remote from the location at which power and/or signalling is required.

Thus any above system may include one or more of: at least one existing anode; at least one anode provided in water, say the body of water in which a subsea well installation is provided; at least one anode that is remote from the location at which power and/or signalling is to be achieved using current developed by that anode.

Further any system above may be arranged to enable the transmission of power from a location at which current, say CP current, is applied to the structure to a harvesting and/or signalling location. This being true whether the current is a passive CP current, an impressed CP current, or another applied current. That is to say typically, the source of the CP current or other current is remote from the harvesting and/or signalling location.

Further, the metallic structure may be uninterrupted in the region of the at least one anode and/or the region of the harvesting module.

Where mention is made above of optimisation by modelling for example in relation to the spacing of connections, use of insulation, choice of radial only spacing or axial, and the selection of a pre-set harvesting load, at least one of the following parameters maybe used in the model:

1. Attenuation rate at the top of the well derived from casing and tubular dimensions, weights, and material type (resistivity) type and the resistivity of the overburden (medium surrounding the well).
2. Upper connection location.
3. Lower connection location.
4. Cross Sectional Area and material (resistivity) type of the upper cable used on inputs to the harvester.
5. Number, location, material (electro-potential) and surface area of the wellhead anodes.
6. Effective resistance of the well seen from the seabed/wellhead, again derived from casing and tubular dimensions, weights, and material type (resistivity) and resistivity of the overburden (medium surrounding the well) but this time for the whole completion.

In each case above systems may comprise a primary battery for supplying power independently of harvested power. The harvesting module may comprise the primary battery. Where a primary battery is provided this may be used preferentially whilst it holds power. It might be used for example to enable use of a higher date rate at an early stage, this being allowed to fall when only harvested power is available.

According to another aspect of the invention there is provided a well installation comprising metallic structure carrying electric current and any of the above systems or apparatus, thus say at least one of: a downhole electrical energy harvesting apparatus or system; a downhole device operation apparatus or system; a downhole communication repeater apparatus or system; a power delivery apparatus or system; or a harvesting module; or a downhole well monitoring apparatus or system; or downhole communication apparatus or system, as defined above. Such an installation may further have a cathodic protection system for protecting the metallic structure.

Note that in general each of the optional features following each of the aspects of the invention above is equally applicable as an optional feature in respect of each of the other aspects of the invention and could be re-written after each aspect with any necessary changes in wording. Not all such optional features are re-written after each aspect merely in the interests of brevity.

For example it will be appreciated that any of the systems, methods, apparatus and installations mentioned above may make use of a harvesting module having any combination or sub-combination of the features defined above, and so on.

The well mentioned in any of the above methods, systems, apparatus, or installations may be a subsea well.

BRIEF DESCRIPTION OF THE DRAWINGS

Embodiments of the present invention will now be described, by way of example only, with reference to the accompanying drawings in which.

DETAILED DESCRIPTION OF EXAMPLE EMBODIMENTS

Figure 1:
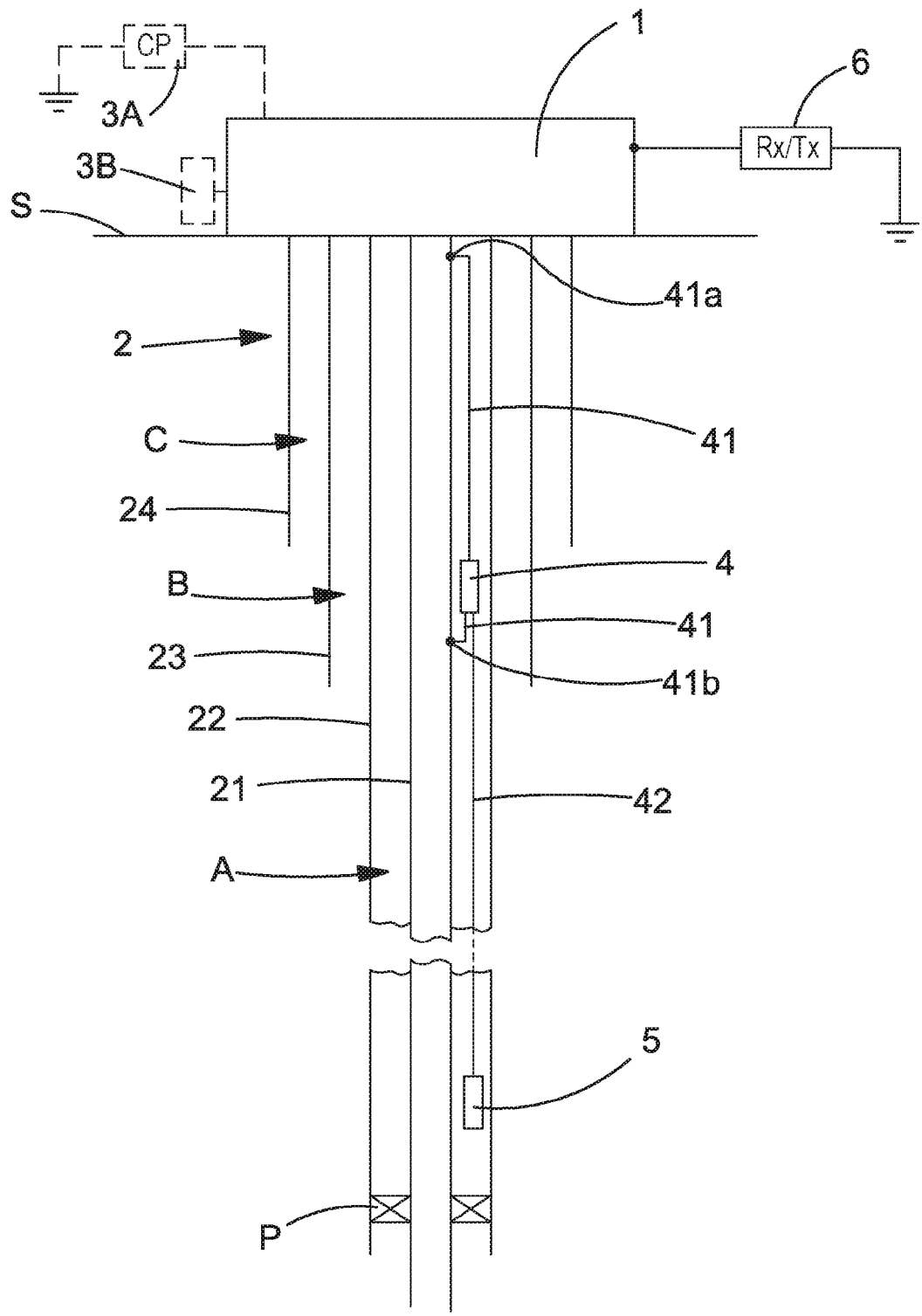
FIG. 1 schematically shows a well installation including well monitoring apparatus including a downhole power delivery system.

FIG. 1 shows a well installation of an oil and/or gas well. As is well understood, such an oil and/or gas well may be a land well or a sub-sea well (meaning a well under any body of water) where the well head is underwater on the sea, river, lake etc. bed or on a platform. Often well installations are provided with a cathodic protection system. In the case of land wells this will most likely be in the form of an impressed current cathodic protection system where a protective current is applied to the metallic structure of the well. On the other hand for a sub-sea well, the cathodic protection will most likely be a passive cathodic protection system where a plurality of anodes of a relatively reactive metal, such as a magnesium alloy, are connected to the metallic structure and exposed to the water in which the well installation is situated Note that the present techniques are also relevant for water injection wells—that is wells used to inject water into a reservoir to aid recovery of oil and/or gas from other wells in the field. Thus a "well installation" in the present specification may be a water injection well. Such a well will have a similar construction to the installations shown in more detail in this application. Similarly the present techniques may be used whilst drilling as well as during production and following abandonment. Thus the well installation may be a partially complete installation where drilling is taking place. More generally the present techniques may be used during any period of the life cycle of a well installation.

Further, whilst this specific description is written in relation to installations where cathodic protection is present and this is particularly preferred, many of the present systems and techniques also function in other situations where electric current is flowing on the metallic structure and power may be harvested therefrom.

The well installation shown in FIG. 1 comprises a well head 1 and downhole metallic structure 2 leading down into the borehole of well from the surface S. The well installation is provided with a cathodic protection system 3A, 3B. As alluded to above, this will either be an impressed current cathodic protection system 3A or a passive cathodic protection comprising a plurality of anodes 3B connected to the metallic structure of the well installation, that is to the well head 1 or other metallic components connected thereto.

The downhole metallic structure 2 comprises a first run of metallic pipe 21, that is, production tubing, running down into the borehole of the well. Around this is a first casing 22. Outside this layer is a second casing 23 and then a third casing 24. As will be appreciated there is a respective annulus between each run of metallic pipe. Thus there is a first annulus between the production tubing 21 and the first casing 22 commonly referred to as the "A" annulus in the oil and gas industry and indicated by reference numeral A in the drawings. A second annulus exists between the first casing 22 and the second casing 23 commonly known as the "B" annulus and so indicated in the drawings and a third annulus exists between the second casing 23 and the third casing 24 commonly known as the "C" annulus and so indicated in the drawings. Wells also typically can have a further, "D", annulus, and sometimes even more annuli.

In other situations the metallic structure may comprise other elongate members, specifically, one or more of casing, liner, tubing, coiled tubing, sucker rod.

Monitoring apparatus provided in the well installation comprises an electrical power harvesting module 4 provided, in this embodiment, in the A annulus. The harvesting module 4 is electrically connected via cables 41 to a pair of spaced locations 41a, 41b on the production tubing 21. In an alternative the harvesting module 4 may be electrically connected to one of the locations via a cable but may be electrically connected to the other location without a cable. The harvesting module 4 may be electrically connected via a conductive housing of (or surrounding) the harvesting module to one of the locations. Thus only one such cable may need to exit the housing.

Note that there is galvanic connection between the harvesting module 4 and the metallic structure 21 at the spaced locations 41a, 41b. Particularly there is a galvanic connection to the metallic structure 21, rather than, for example, an inductive coupling. This simplifies the construction and removes engineering difficulties. In the present case there is a galvanic connection all of the way from the metallic structure to the inputs of the circuit included in the harvesting module for harvesting energy.

Furthermore it will be noted that the metallic structure of the well is generally unaffected by the installation of this system. No insulation joints have been introduced into any of the runs of metallic pipe in order to make the system effective and the normal flow of cathodic protection current in the structure has not been altered—other than, of course, the harvesting which is taking place. Thus for example, between the spaced locations the run of metallic structure to which the connections are made is continuous, more generally all of the runs of metallic structure are continuous at these regions. This is not essential for operation, but it is possible and it is the normal prevailing situation in a well installation—ie the standard metallic structure of the installation has been left unchanged. Similarly the current can and does flow in the same direction in the metallic structure in the region of the connections and between the connections. Again this is the normal prevailing situation in a well installation, modification to the well installation has been avoided. The current flow might be in a single run of metallic structure to which the connections are made, or jump from one run to another or flow in parallel in several runs—the point is that an artificial arrangement of metallic structure in the well has not had to be set up to allow the system to work, and as such there is an uninterrupted current flow path provided by the metallic structure and current flow is in the same longitudinal direction in the metallic structure.

Note that the "A" annulus is often accessible by cable through the well head 1. However, it is still advantageous to use the present arrangements as they minimise the number of penetrators in the well head, reducing risk and expense and/or freeing up a penetrator for other use.

The monitoring apparatus further comprises a downhole gauge 5 which is provided deeper in the well than the harvesting module 4 and is connected thereto via a cable 42. In this embodiment the downhole gauge 5 is provided just above a packer P. Typically the cables 41 connecting the harvesting module 4 to the production unit 21 will be tubing enclosed conductors (TEC) as typically used in the oil and gas industry and the cable 42 connecting the harvesting module 4 to the downhole gauge 5 will also be a tubing enclosed conductor (TEC). Moreover typically the cross-sectional area of the conductor in the lengths of cable 41 connecting the harvesting module 4 to the production tubing 21 will have a larger cross-sectional area than that of the cable 42 connecting the harvesting module 4 to the downhole gauge 5.

Where cathodic protection is provided in a well installation, the potential of the metallic structure of the well is taken to a sufficiently negative potential at the point of injection, say the well head 1, such as to suppress corrosion at the well head and at other points along the downhole metallic structure 2 as it descends into the well. However the magnitude of this negative potential will decrease as one progresses further down into the well due to the losses in the system. Therefore the potential of the metallic structure 2 near the well head will be more negative than at deeper locations in the well. Thus when cathodic protection currents are flowing in the well installation there will be a potential difference between the location 41a where the first of the cables 41 from the harvesting module is connected to the production tubing 21 and the location 41b where the other of the cables 41 from the harvesting module 4 is connected to the production tubing 21. Thus the harvesting module 4 will see a potential difference across it and as such can extract energy from the cathodic protection currents.

It will be noted that extracting energy will use power from the cathodic protection system however the impact on the effectiveness of the cathodic protection system or any acceleration of the corrosion of the anodes will be negligible. Typically cathodic protection currents will be of the order of 10 Amps whereas the present systems might extract say 10-100 milli Amps. Thus the amount of current extracted is well within the tolerance usually allowed for when developing cathodic protection systems. If desired an increased level of impressed current can be provided or the number of anodes provided could be increased beyond the norm. This would increase the cathodic protection current and hence improve harvesting.

Electrical power may be harvested from the system at the downhole location of the harvesting module 4 and this harvested power may be used for other purposes.

In the arrangement of FIG. 1 this harvested power is used to power the downhole gauge 5 and allow extraction of readings therefrom and communication of those readings to the surface S.

In the present embodiment an upper communication unit 6 is provided for communicating with the harvesting module 4 and downhole gauge 5. In this instance the upper communication unit 6 is provided at the surface S—in this case the land surface.

It will be appreciated that arrangements such as the present one may be used in place of a conventionally installed permanent downhole gauge (PDG) with the advantage that use of a penetrator through the well head can be avoided, whilst life of well monitoring will be feasible in many cases. Monitoring may be of reservoir pressure where desired or similarly of the pressure in an enclosed annulus to, for example, help detect any leak, issue, or failure in the system. The sensor and harvesting module may be located in the enclosed annulus, in such a case.

All of these options are possible in say a subsea well installation where there will normally be a ready source of current to be harvested—ie CP current, typically generated by sacrificial anodes located in the water in which the subsea installation is provided, and where other power and signalling options are more problematic.

In a well with a subsea wellhead, conventionally it is not generally possible (practically/cost effectively) to provide hydraulic or electrical connectivity with the outer annuli (B, C etc). Particularly where these annuli are sealed at their base it is useful to monitor and optionally control pressure in these annuli, for instance, to reduce the risk of high pressures causing collapse of the casing. In particular the flow, or drilling of the well may increase the temperature of the sealed outer annulus and hence increase the pressure therein. The ability to monitor pressure in such a case and optionally control pressure in such a case (such as with a vent valve between annuli, as mentioned elsewhere) is beneficial. In particular, monitoring the pressure in an enclosed annulus may permit production at higher rates than those achievable if modelling of the expected pressure rise alone is used as use of modelled pressure would require greater safety margins and potentially correspondingly reduced production rates. As will be appreciated the present techniques can facilitate such monitoring and/or control.

Another particular implementation of the present techniques will include a sensor module located in the same location as is most usual for a conventional permanent downhole gauge and provided for the same purpose as is most usual for a conventional permanent downhole gauge.

Thus the sensor module may be disposed in the A annulus and arranged for monitoring the reservoir pressure by sensing the pressure in the tubing via a pressure communication port through the tubing so allowing inference of the reservoir pressure based on the sensed pressure and taking into account static pressure and flow effects. As is the case with a conventionally used PDG, reservoir pressure will generally be inferred in this way rather than directly measured—positioning a sensor directly in the reservoir is generally not feasible—as will also be appreciated "monitoring reservoir pressure" covers use of such measurement techniques.

A harvesting module may also be provided at the location of the sensor module.

Different techniques may be used for allowing the extraction of data from the downhole gauge 5 towards the surface.

In the present embodiment the harvesting module 4 is arranged to accept a signal from the downhole gauge which is indicative of the parameter to be measured, for example, pressure and/or temperature and to transmit this data towards the surface by virtue of modulating the load which the harvesting module 4 creates between the spaced connections 41a and 41b. In turn this change in load will change the amount of current drawn from the cathodic protection currents applied to the system. This in turn is detectable at the surface or other convenient location by the virtue of a change in the potential of the metallic structure at the surface or the other convenient location. It may be detected by detecting for example, the change in potential at the well head 1 or by detecting the voltage across, or a current seen by, a power supply used in an impressed cathodic protection system 3A. In the present embodiment the effect of the modulation is detected by the upper communications unit 6, monitoring the potential of the well head relative to a reference earth, to extract the pressure and/or temperature measurement data.

Preferably the spacing between the spaced connections 41a, 41b is at least 100 metres and more likely in the region of 300 to 500 metres. The optimal spacing for the spaced connections 41a, 41b may be determined by modelling for a given installation. As the distance between these connections is increased this tends to increase potential difference between the connections (although the rate of increase of potential difference decreases as the depth of the lower connection is increased). On the other hand, as the spacing increases the total length and hence resistance of the cables 41 increases. Thus in most systems there will be an optimal spacing.

Figure 2A:
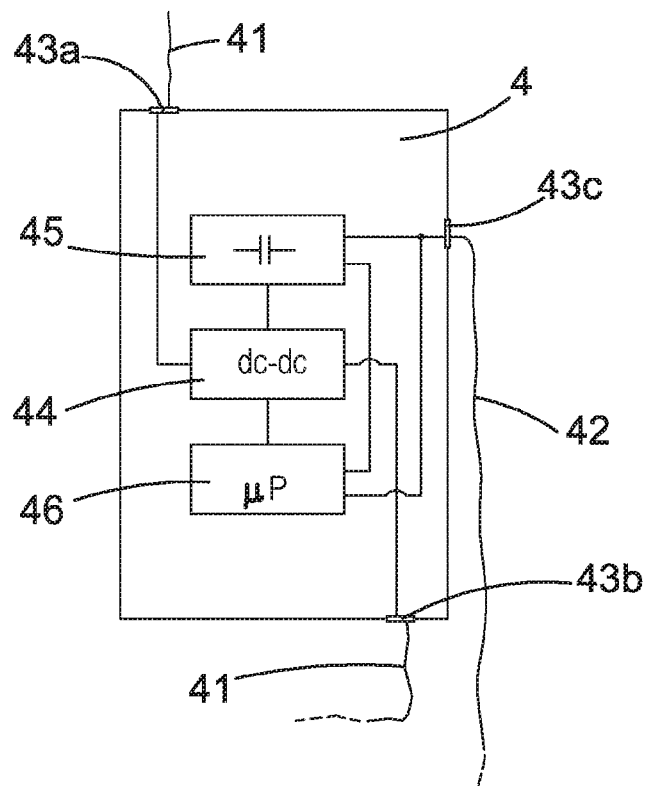
FIG. 2A schematically shows a harvesting module of the power delivery system of FIG. 1

FIG. 2A shows the harvesting module 4 of the apparatus shown in FIG. 1 in more detail. In this embodiment the harvesting module 4 has a pair of terminals 43a, 43b to which the respective cables 41 are connected. There is galvanic connection between the metallic structure and the terminals 43a, 43b. Connected between these terminals 43a, 43b is a low voltage dc to dc converter for harvesting the electrical energy where potential difference is seen across the terminals 43a, 43b. The dc to dc converter 44 is connected to a charge storage means 45 including at least one low leakage capacitor and connected to and controlled by a microprocessor driven central unit 46. The charge storage means 45 and central unit 46 are also connected via a respective terminal 43c to the length of cable 42 which leads to the downhole gauge 5. In an alternative the charge storage means 45 might be dispensed with—ie: enough power might be harvested to allow continuous operation as and when required.

In operation, the central unit 46 controls the operation of the dc to dc converter 44 so as to optimise the load which it presents to the current seen by the harvesting module 4 due to the cathodic protection currents in order to maximise the energy which may be harvested and used or stored in the charge storage means 45. Note that the central unit may be arranged to selectively use and/or deliver harvested energy directly when appropriate, and store energy and extract stored energy when appropriate.

Note that in an alternative the microprocessor driven central unit 46 may be replaced by alternative electronics including say an analogue feedback circuit, or a state machine or even a fixed harvesting load based on modelling for the particular installation.

When stored energy is to be used, power from the charge storage means 45 is fed via the cable 42 to the downhole gauge 5 and readings from the downhole gauge 5 are acquired by the central unit 46 via the cable 42. The central unit 46 also controls operation of the dc to dc converter 44 to modulate the load which is introduced between the terminals 43a and 43b in order to send signals back to the surface carrying readings from the downhole gauge 5 as described above.

Note, that in the present embodiment the dc to dc converter 44 and central unit 46 together act as a variable impedance means by virtue of the central unit 46 controlling the operation of the dc to dc converter 44 to introduce variable impedance between the terminals 43a and 43b.

Note that in alternatives, rather than a sensor being provided in a separate downhole gauge 5, an appropriate sensor may be provided at the same location as the harvesting module 4.

Figure 2B:
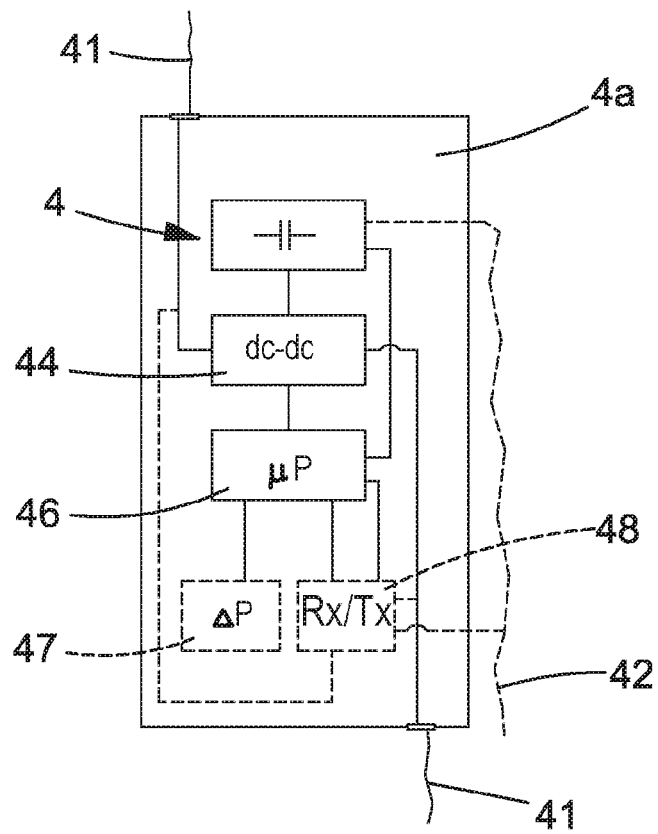
FIG. 2B shows an alternative downhole unit.

In particular, a downhole unit 4a as shown in FIG. 2B may be provided which comprises both a harvesting module 4 and at least one downhole device to be powered. In this case the downhole unit 4a includes a pressure sensor 47 and a communications unit 48.

In such case there may be no secondary cable 42 leading away from the downhole unit 4a. On the other hand in some other cases the downhole unit 4a might still be used to power an external device even if including its own sensor 47 and/or communications unit 48 and thus there might be a secondary cable 42.

In alternatives, rather than communicating to the surface using the load modulation technique as discussed above, the downhole unit 4a might use its own communications unit 48 for communicating back towards the surface. Such communication might be in the form of the EM communication signals which may be applied back to the downhole metallic structure 21 via the cables 41. In other cases the communications unit 48 provided in the downhole unit 4a might be an acoustic communications unit for applying acoustic signals to the metallic structure 21 for transmission back towards the surface. In such a case then an upper communications unit would be arranged for receiving acoustic signals. It will be appreciated that two way communication may be provided as and when desired over any or all parts of the communications channels. Further two communication techniques may be used parallel in any leg of the communications channels—thus EM signals and acoustic signal might be used side by side.

In further alternatives the harvesting module 4 or downhole unit 4a may comprise at least one power converter for controlling the voltage at which the power is harvested for delivery to the charge storage means 45 and/or other components such as the central unit 46. It may be desirable to store energy at a different voltage than that at which it is harvested and/or different from that at which it is used by the central unit 46 or other components. For example, it may be desirable to store the power at a higher voltage than that at which it is harvested and/or consumed. This can be useful, for example, if there is a large draw on the stored power during for example transmission.

A possible implementation for a dc to dc convertor is to use a commercially available integrated circuit. An alternative is to produce a similar circuit using discrete components. To provide effective performance a dc to dc convertor that can cope with low input voltages is desirable. One way to achieve this is to use a Field Effect Transistor, such as JFET switch, to form a resonant step-up oscillator using a step-up transformer and a coupling capacitor. In order to help optimize energy harvesting the turns ratio on the transformer may be selected, preferably dynamically selected during operation. A plurality of tappings may be provided on the secondary of the transformer which may be selectively used to provide respective turns ratios.

A processor, such as that of the central unit may be arranged to control a switch to dynamically select the respective tappings and hence control the load generated by the dc-dc convertor.

Figure 2C:
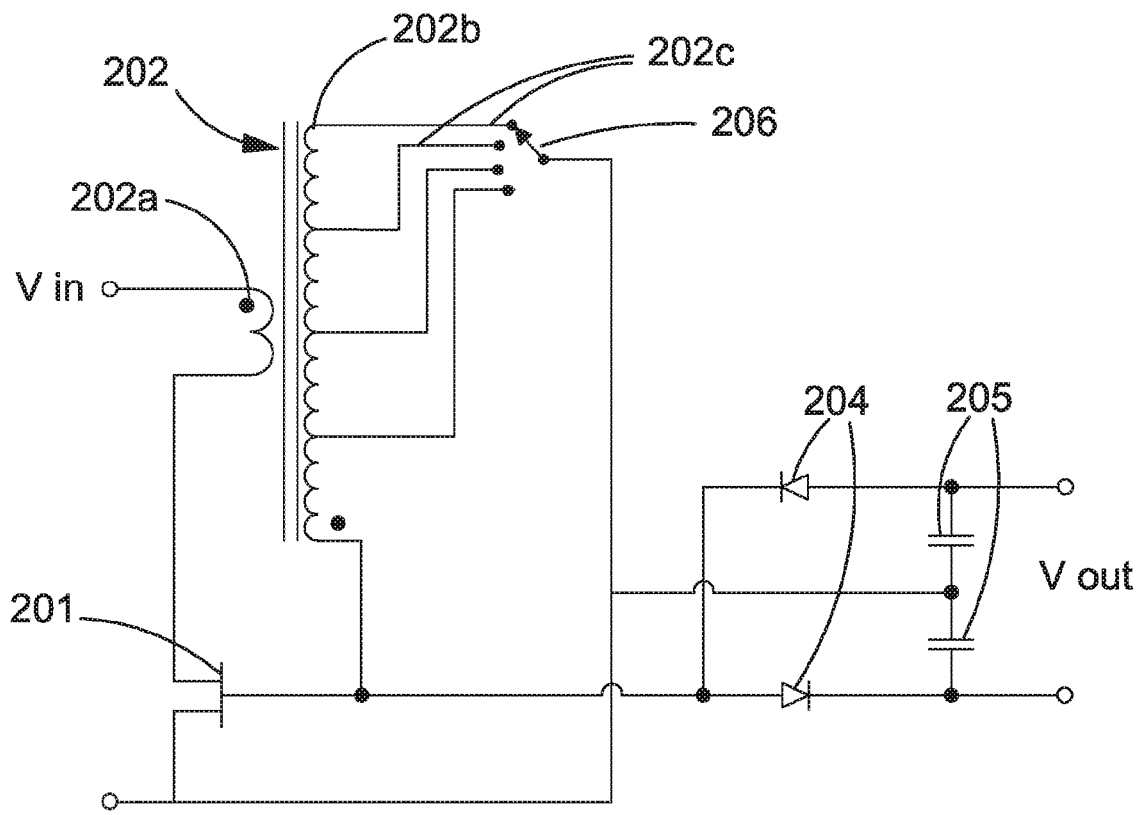
FIG. 2C is a schematic circuit diagram of a dc to dc convertor which may be used in a harvesting module.

FIG. 2C shows a schematic circuit diagram for a possible implementation of a resonant step-up oscillator of the type described above. The available input potential difference may be connected across the input terminals as Vin and the output Vout is seen across the output terminals. The circuit comprises a Field Effect Transistor 201, a step up transformer 202 which together act as an oscillator and a rectifying output arrangement 203 comprising a crossed diode pair 206 and respective coupling capacitors 205. A primary winding 202a of the transformer 202 is connected in series with the FET 201 and the input Vin is applied across these. The gate of FET 201 is connected to the secondary winding 202b of the transformer 202. The output Vout is seen across the coupling capacitors 205 which are each connected across the secondary winding 202b via the respective diodes 204.

The secondary winding 202b of the transformer 202 comprises a plurality of tappings 202c which can be selected using switch 206 so allowing adjustment of the turns ratio. The switch 206 can be controlled by a microprocessor, in this case the central unit 4b.

This type of dc to dc convertor arrangement is able to function even when the potential difference seen across the terminals (input voltage) is low, that is 0.5V or below. In practical examples the input voltage may be less than 0.25V and perhaps even less than 0.05V. As this is very low compared with semiconductor band gap voltages (say 0.7V)

many types of dc to dc convertors will not function to allow energy harvesting at such input voltages. However, dc to dc convertors based on the above principles can function at even such low voltages. Such a dc to dc convertor can be considered to include start up means arranged to allow operation when the input voltage is 0.5V or below as well as at higher voltages.

An alternative approach is to provide a circuit with a separate power source to act as part of a start up means. Thus, for example, a primary battery may be provided to start up the system after installation. Furthermore stored energy in an energy store might be used to restart the system if energy harvesting temporarily stops.

Figure 2D:
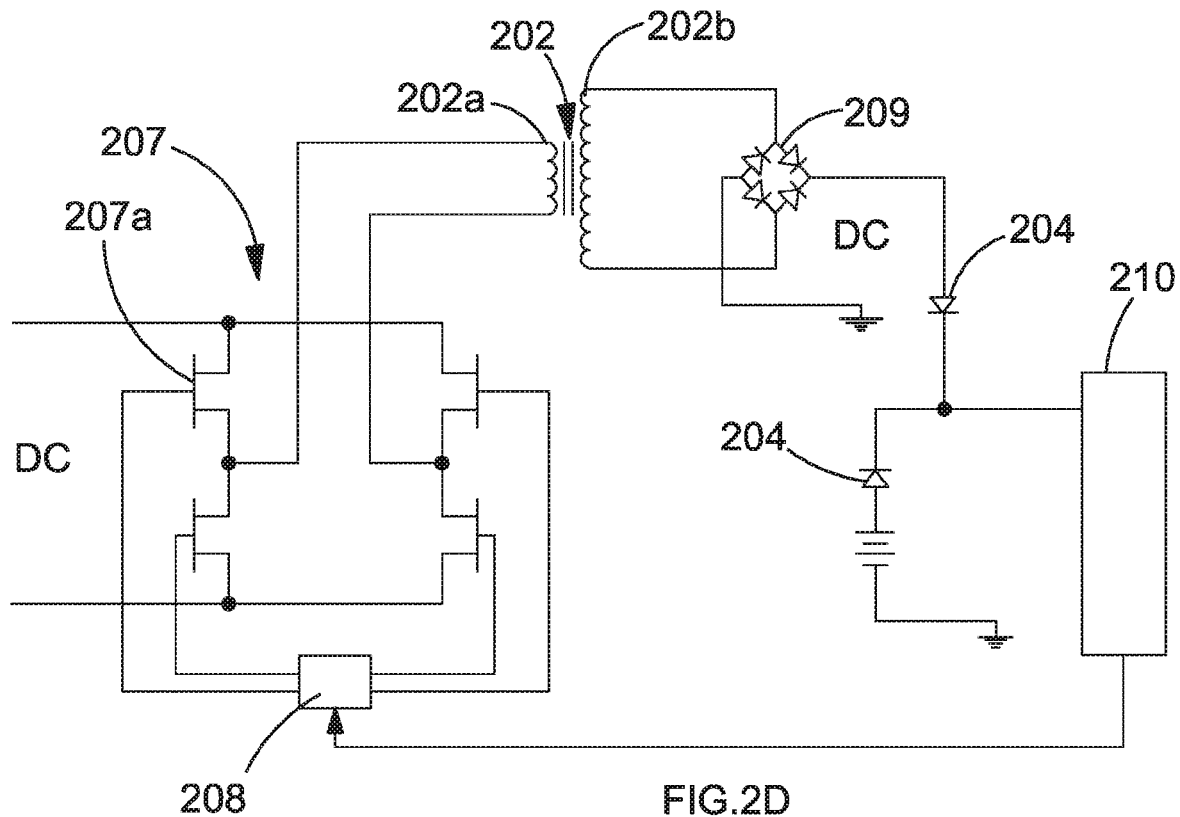
FIG. 2D is a schematic circuit diagram of a dc to dc convertor which may be used in a harvesting module.

FIG. 2D shows a schematic circuit diagram for a possible implementation of a dc to dc convertor operating on such a basis. The dc to dc convertor of FIG. 2D comprises an H bridge 207 of transistors 207a across which the input voltage is connected. The gates of the transistors 207a are connected to a control unit 208 which is arranged to control the switching of the transistors 207a to generate an ac output. The ac output of the H bridge 207 is connected across a primary winding 202a of a step up transformer 202. The secondary winding 202b of the transformer 202 is connected to a rectifier 209. One output of the rectifier 209 is connected via a diode 204 to the input of a power supply unit 210 and the other output is connected to ground. Also connected to the input of the power supply unit 210 via another diode 204 is a battery 211.

The power supply unit 210 is arranged to power the control unit 208. In order to start up operation the power supply unit 210 may use power from the battery 211. Once energy is being harvested by the dc to dc convertor then the power supply unit 210 may use power received from the rectifier 209—ie harvested power.

Whilst in the present embodiment power is used directly as harvested, in alternatives harvested energy may also be stored in a storage means and used from the storage means. As described elsewhere in this application, the storage means may, for example, include at least one low leakage capacitor and/or at least one rechargeable cell. Where energy is stored this allows a mechanism to restart the system if harvesting is ceased at any point after the battery 211 has discharged.

The battery 211 may be a primary (one shot) battery, or may be a re-chargeable battery provided it is charged at the time of installation. Where the battery is a re-chargeable battery, in some implementations the power supply unit 210 may be arranged to store energy in it when available, alternatively it may be more convenient to provide a separate energy storage means (which might include a rechargeable battery).

Note also that in a further alternative a dc to dc convertor of the type shown in FIG. 2D may be arranged to allow control of the load generated by the dc to dc convertor. Thus for example, a similar arrangement to that shown in FIG. 2C may be used where the secondary winding 202b has multiple tappings and a switch is provided to allow selection of the tappings. This switch could sit between the windings and the input to the rectifier 209. In another alternative separate secondary windings could be provided rather than multiple tappings, to achieve a similar result. The switch can be controlled by a control unit as in the case of the arrangement of FIG. 2C.

Note also that in other embodiments the harvesting module 4 and downhole gauge 5 (or downhole unit 4a) may be provided in other annuli within the well installation rather than the A annulus. Further the gauge may be arranged to sense a parameter in a different annulus than the one in which it is located.

For example, these components may be provided in the B or C annulus and a gauge located in say the B annulus may be arranged to sense one or more parameter in the A annulus, the B annulus, the C annulus or any combination thereof. It is noted that these are locations where it is generally not possible, or at least undesirable, to try to provide direct cable connections from the surface. Thus the present techniques give rise to the possibility of monitoring say pressure in the B or C annulus for the life of a well installation where this would be difficult and/or expensive using conventional power delivery methods. The present techniques avoid the use of penetrators through the well head which can reduce risk and cost. They also provide relatively simple, neat and easy to install solutions.

Figure 3:
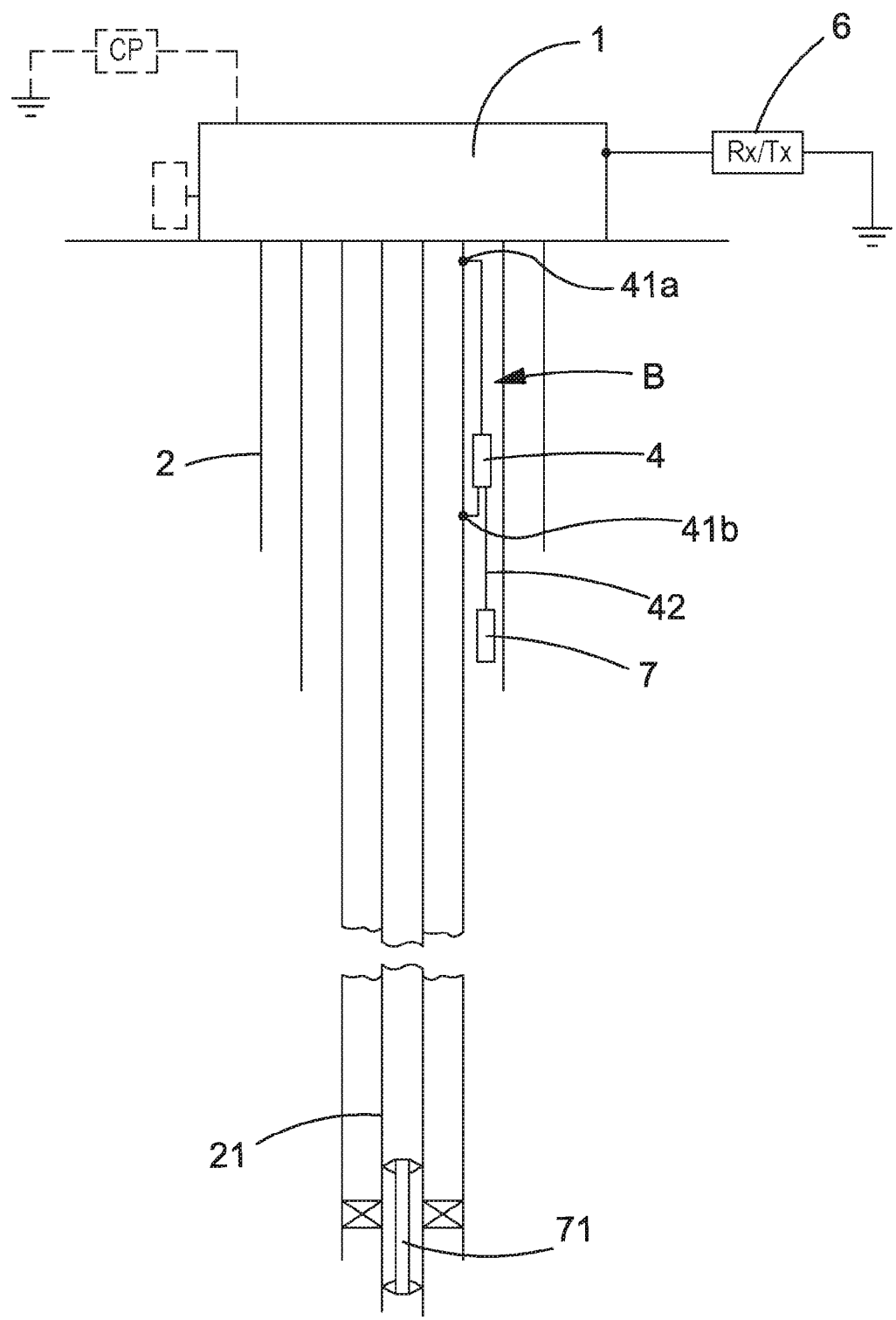
FIG. 3 schematically shows a well installation including downhole communication apparatus which comprises a downhole communications repeater and a downhole power delivery system for powering the downhole communications repeater.

FIG. 3 shows a well installation similar to that of FIG. 1 but including a downhole communications repeater 7 rather than a downhole gauge. The repeater 7 is provided in the B annulus along with a harvesting module 4 of the same type described above in relation to FIGS. 1, 2A to 2D. Here again the harvesting module 4 harvests power from the cathodic protection currents in the metallic structure 2 and provides this power to the downhole communications repeater 7.

The structure and operation of the well installation, cathodic protection system and power delivery system in the arrangement of FIG. 3 is substantially the same as that in the system described with reference to FIGS. 1, 2A to 2D. The only difference resides in the fact that the downhole component delivered power by the power delivery system is a communications repeater 7 rather than the downhole gauge 5.

Thus, detailed description of the well installation and power delivery system is omitted here in the interests of brevity. Where components are referred to in respect of this embodiment which are the same as that in FIGS. 1 and 2A to 2D, the same reference numerals are used.

The downhole communications repeater 7 is arranged to pick up signals from the downhole metallic structure 2 in the region of the repeater 7 and transmit the relevant data onwards towards the surface. In this embodiment the signals are applied to the downhole metallic structure 2 as EM signals by a transmission tool 71 located further down in the well, for example in the production tubing 21. Correspondingly the repeater 7 is arranged to pick up EM signals.

In alternatives a different type of transmission tool may be provided for sending signals which are picked up by the repeater. Such a tool may, for example, be disposed outside of the tubing.

In alternatives the communications repeater 7 may be arranged to pick acoustic signals from the downhole metallic structure 2 which have been applied further downhole.

Similarly, the downhole communications repeater 7 may be arranged to apply acoustic signals to the downhole structure 2 for transmission towards the surface or arranged to apply EM signals to the downhole metallic structure 2 for transmission to the surface or to make use of the impedance modulation signalling technique described above.

Thus, for example the communications repeater 7 may pick up signals at its location and transmit these along the cable 42 to the harvesting module 4 by applying signals thereto or by modulating the load which it puts on the power supply in the harvesting module 4. Similarly, the harvesting module 4 may be arranged to apply signals to metallic structure 2 for transmission towards the surface or be arranged to modulate the load which it generates between the spaced connections 41a, 41b for detection at the surface by the upper communication unit 6.

Note that in the case of the provision of a downhole communications repeater 7, EM signals may, for example, be picked up and/or applied by the repeater 7 using spaced contacts made to the metallic structure, or using an inductive coupling comprising a toroid or signalling across an insulation joint should one be available and so on. Similarly conventional acoustic signal pick up and application techniques may be used.

In alternatives there may be communication from the surface downwards to downhole locations and in general two way communication. Thus the repeater 7 may act as a repeater in both directions. Again two communication techniques may be used in parallel on at least one leg of the channel to provide redundancy.

Note also that the downhole communications repeater 7 may be provided in a location such as not to be in the product flow whilst allowing life of well operation.

Two specific examples relating to FIG. 3 are:
1. The repeater 7 comprises a continuously powered EM receiver at 3-500 m depth which either receives and decodes messages or simply continuously re-transmits using load impedance modulation at a higher frequency, raw data/signal for decode at the surface.
2. The repeater 7 comprises a continuously powered acoustic receiver at 3-500 m depth which receives and decodes messages and then re-transmits data to surface using load impedance modulation.

Note that in both these cases the repeater 7 maybe provided in a downhole unit with the harvesting module, or be separate therefrom. Again the repeater may be a two way repeater.

In any of the systems described in this specification the devices may be arranged to manage the power budget, i.e. use less energy overall, by using intermittent operation of the components such as EM or acoustic receivers and/or transmitters.

Figure 4:
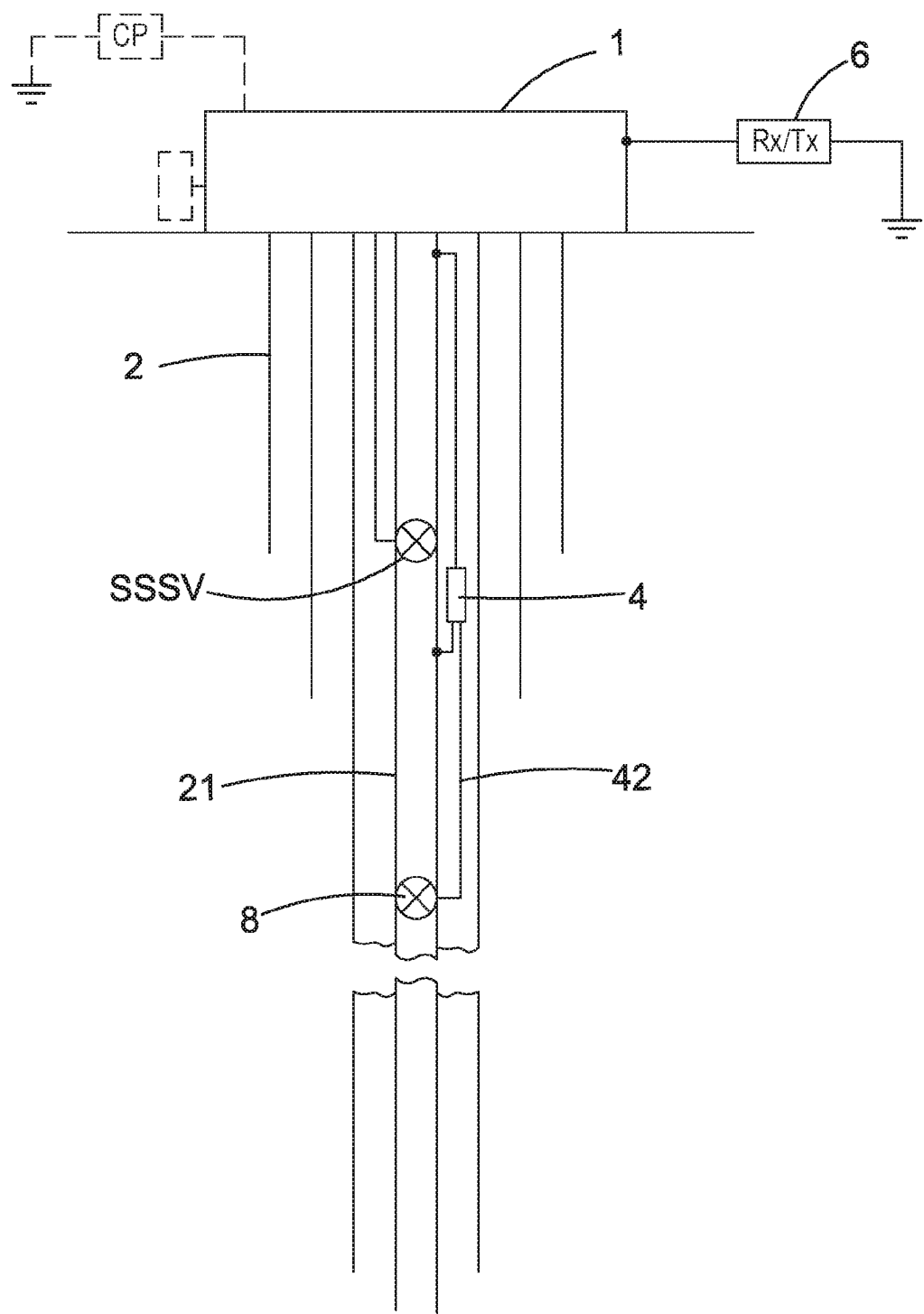
FIG. 4 schematically shows a well installation including valve operation apparatus comprising a remotely controlled downhole valve and a power delivery system for powering the remotely controlled downhole valve.

FIG. 4 schematically shows a well installation including a remotely controlled valve and a power delivery system of the same general type as described above.

The general structure and operation of the well installation and the power delivery system is again substantially the same as that described above in relation to the arrangements shown in FIGS. 1, 2A to 2D. Thus detailed description of those common elements is omitted here for the sake of brevity and the same reference numerals are used to indicate those features which are in common between the two embodiments.

In this embodiment the well installation comprises a first hydraulically operated sub-surface safety valve SSSV provided in the production tubing 21 as is conventional.

However, here an additional subsurface safety valve 8 is provided also within the production tubing 21, but further down in the well. Thus in the present case the second subsurface safety valve 8 is provided as an additional safety or fallback measure. However, in alternatives it might be that the hydraulically operated subsurface safety valve SSSV could be dispensed with.

The second subsurface safety valve 8 is powered and operated by making use of a power delivery system. In particular a harvesting module 4 is connected to the second sub-surface safety valve 8 via a cable 42 and the harvesting module is arranged to issue power and control signals to the second subsurface safety valve 8 via the cable 42. Thus energy is harvested from the cathodic protection currents running in the downhole structure 2 and this is used to both control and operate the second subsurface safety valve 8.

Such a subsurface safety valve 8 may be located deeper into the well than a traditional hydraulically operated sub-surface safety valve SSSV. This is because it is not subject to the same range limits as hydraulically driven systems—there is no requirement to drive hydraulic fluid to it.

It will be noted that here control signals for the second subsurface safety valve 8 may be transmitted by the upper communications unit 6 via the metallic structure of the well 1, 2 for detection by the harvesting module 4 and onwards transmission to the subsurface safety valve 8. In some circumstances the valve 8 may be caused to operate in a fail safe mode such that the valve will close in the absence of power and/or control signals. Note of course that in an alternative the valve 8 and harvesting module might be provided as part of a common downhole tool 4a. Further in some cases power for closing the valve may come from another source, with the downhole power delivery system supplying power for controlling operation and/or operating a trigger mechanism.

Figure 5:
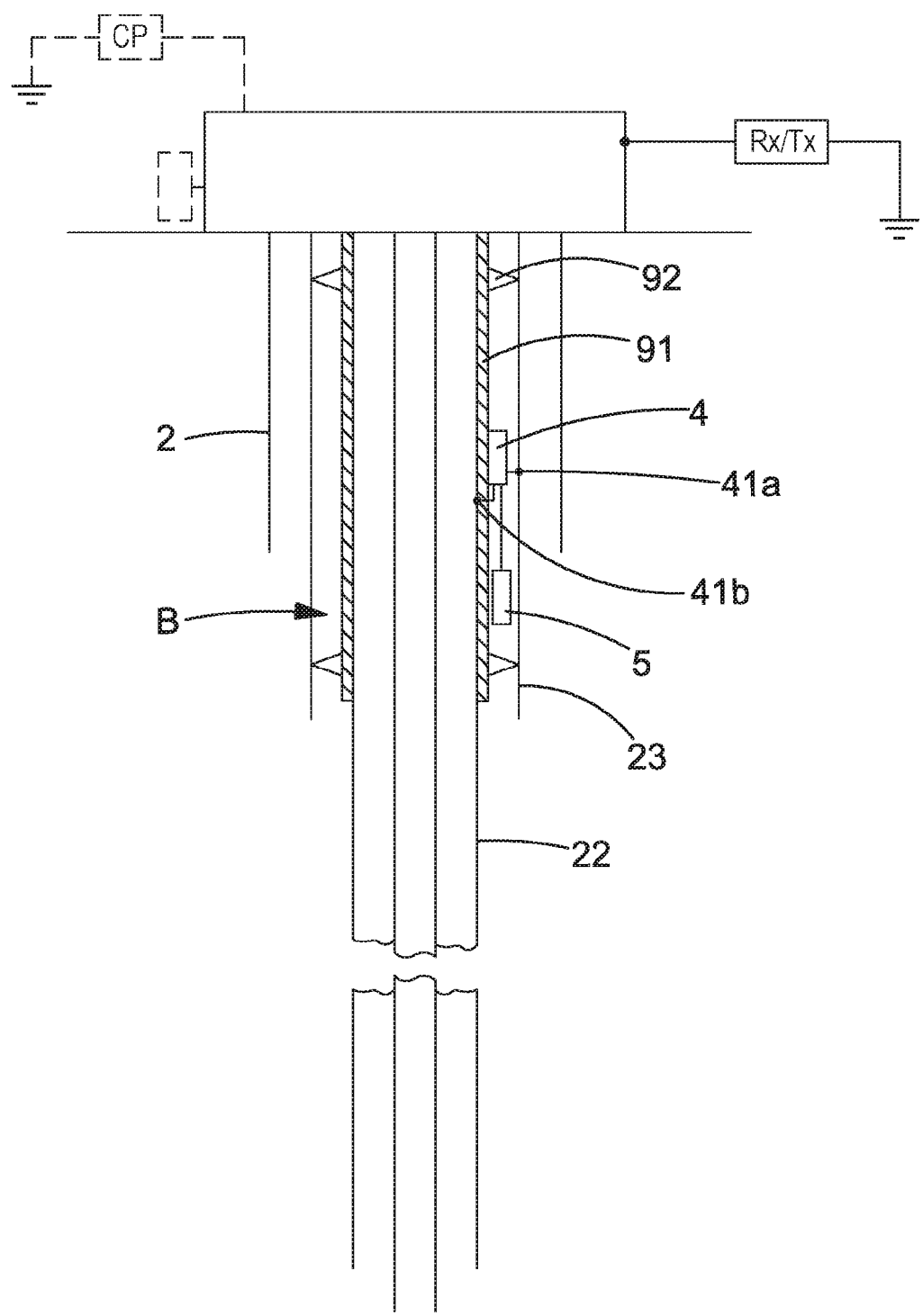
FIG. 5 schematically shows a well installation including an alternative well monitoring system comprising a downhole gauge and a downhole power delivery system for powering the downhole gauge.

FIG. 5 shows an alternative well installation including well monitoring apparatus. Here again there are similarities with the arrangement shown in and described with reference to FIGS. 1, 2A to 2D. Again there is a harvesting module 4 provided within the downhole metallic structure 2 and connected to spaced locations on the downhole structure 2 and moreover there is a downhole gauge 5 connected to the harvesting module 4. In this instance the harvesting module 4 and downhole gauge 5 are both provided in the B annulus to provide monitoring of conditions in this annulus. The downhole gauge 5 may, for example, comprise a pressure and/or temperature sensor.

In this instance the spaced locations 41a, 41b are provided on different runs of the downhole metallic structure 2. In particular in this embodiment, a first of the connections 41a is made to the second casing 23 whilst the other of the connections 41b is made to the first casing 22. The system works on a similar principle as discussed above and therefore relies on a potential difference existing between these two connections 41a, 41b. In the present embodiment this potential difference is realised by virtue of insulating the two runs of metallic structure 22, 23 from one another in at least the region of these connections. This means that there is a different passage to earth for the cathodic protection currents from the two runs of metallic structure 22, 23. In the present embodiment the means of insulating the two runs of metallic structure 22, 23 from one another comprise an insulating coating 91 provided on the outer surface of the first casing 22 and a plurality of insulating centralisers 92 provided on the first casing 22 to keep this separated from the second casing 23.

Preferably this insulation 91 and these centralisers 92 will be provided over a length of the first casing 22 of at least 100 metres and more likely 300 to 500 metres. Where desirable and practical, insulating spacers may be mounted on the outer run of metallic structure forming the annulus. Thus for example, mounted on the second casing 23 in the above example. Note that the insulation need not be entirely continuous to provide a useful effect. The creation of a different path to earth is the aim. Thus whilst, say the insulation may be provided over 100 m, it may not be continuous, or provide continuous insulation over this distance.

The benefit of the arrangement shown in FIG. 5 is that the long lengths of cable 41 between the harvesting module 4 and the metallic structure 2 required in the arrangement shown in FIG. 1 can be dispensed with. This means that the system may be easier to install. For example the system may be deployed by virtue of a housing for the harvesting module 4 being mounted on a piece of metallic pipe and provided with a sliding contact for contacting another piece of pipe across the annulus. To further simplify the position the downhole gauge 5 may be dispensed with and a sensor provided along with the harvesting module 4 in a downhole unit 4*a*. Such an arrangement can reduce rig time required for installation.

Thus in some circumstances the provision of the insulation means 91, 92 may be preferable to the provision of the cables 41. Which system is preferable for a given installation may be determined by external factors concerning the installation or perhaps by modelling the particular installation.

In a typical case however, the arrangement of FIG. 1 is likely to give better performance than that of FIG. 5, where it is feasible to use that system.

In an arrangement of the type shown in FIG. 5 relatively higher current but relatively lower potential difference is likely to be seen by the harvesting module. Thus in a FIG. 5 arrangement the potential difference might be say 10-20 mV and current say 1 Amp. On the other hand in a FIG. 1 arrangement, the potential difference might be say 100-200 mV and the current say 100-150 mAmps. Higher potential difference is achieved by the greater spacing given by the cable(s) 41 in the FIG. 1 arrangement, but the lower current is caused by the resistance of the cable(s).

Other than this difference in how the connections are made and a potential difference is achieved, and the different attending benefits and disadvantages, the structure and operation of the system as shown in FIG. 5 is similar to that as shown in FIG. 1. Accordingly the different alternatives which are explained above in relation to FIGS. 1 to 4 are also applicable where a system such as that shown in FIG. 5 is used.

That is to say an insulation and connection arrangement as shown in FIG. 5 may be used in each of the implementations shown in FIGS. 1, 3 and 4 and similarly the different forms of harvesting module 4 and, downhole unit 4*a* discussed above may be used in an arrangement such as that shown in FIG. 5.

Note that in some circumstances it may be desirable to use the present power delivery systems to provide a wireless ready well installation even if there is no intention to use the wireless capabilities when the well is first installed.

Thus the arrangement shown in FIG. 3 where a communications repeater 7 and associated power delivery system is included in the B annulus may be provided when a well is first installed to make the well wireless ready. This will facilitate communication to the surface if at a later time it is decided to use, for example, a downhole wireless signalling tool 71 to signal to the surface. Note here again we are referring to "wirelessness" between downhole and the exterior—i.e. without cables/wires going through the well head.

In other circumstances the present systems may be retro-fitted. For example, a system such as that shown in FIG. 1 installed in the A annulus may be retro-fitted when production tubing is replaced. In another case a system could be installed in the main bore of the production tubing. Note that importantly each of the arrangements and techniques described in the present specification avoid the need for a cable to penetrate through the well head 1. Thus these systems can be used where no penetrator is available or the use of one is unattractive.

Whilst the arrangement in FIG. 4 shows the provision of an additional subsurface safety valve 8, in other circumstances a different type of (possibly remotely operated) valve or component may be provided. For example an arrangement of the type shown in FIG. 4 may be used with an annulus vent valve provided in a well to allow controlled fluid communication or venting between one annulus and another or between an annulus and the bore. The valve could comprise a gas lift injection valve for allowing gas into the bore of production tubing from the A annulus. Similarly the valve may be a packer, a through packer valve or a packer by-pass valve. Again for allowing venting of a particular annulus under control from the surface. In another example the valve may comprise a flow control valve to either control contribution from a zone or provide a means to enable improved pressure build up data capture by removing the effect of well bore storage. Note that the valve in each case may be flow control device which may not allow complete shutting off of flow but say act as a variable choke.

The valve or component in each case may be a wirelessly controlled valve or component.

In another alternative the present techniques may be used for communication with and/or control of a tool supported by a wireline/slick line or attached to coiled tubing in the production tubing 21. That is to say, such a tool may be arranged to apply signals to and/or pick up signals from the tubing which signals pass through the repeater 7.

With systems of the present type one might be able to extract power at the level of perhaps 50 mW. Thus the amount of power which may be extracted is not particularly large, but what is of interest is the fact that this power can be available throughout the life the well and is sufficient for performing useful functions such as controlling downhole devices, taking important measurements and allowing transmission of these measurements to the surface.

Note that in general in embodiments of the general type shown in FIGS. 1 to 4 harvesting efficiency will be dominated by the cross-sectional area of the cable(s) 41 and the source impedance provided by the connections 41*a* and 41*b* is low. This means that if multiple harvesting systems are included in one well installation there is little reduction in performance of any one harvesting module 4. Note that in general any additional harvesting system would have its own cables 41 where appropriate. This is on the basis that losses in cable mean that typically little would be gained by having more than one harvesting system sharing a cable.

In general a plurality of harvesting modules of any of the types described above may be provided in one well installation. Thus, for example, a gauge may be provided to monitor conditions in the production tubing, a gauge may be provided to monitor an annulus, and a valve may be provided, all of which have power supplied from a separate respective harvesting module. Similarly any one harvesting module may be used to power a plurality of devices. In some instances each device may have dedicated cable from the harvesting module. In other instances there may be a multi-drop system where one cable from the harvesting module is used to connect to a plurality of downhole devices. The multi-drop system may be arranged to allow power delivery and communications with the plurality of downhole devices. As such, the cable may carry power signals, communication data and addressing data. Correspondingly the harvesting module may be arranged to administer the multi-drop system.

Note that whilst in the embodiments above the cables 41, 42 run within unobstructed annuli, in other cases one or more of the cables 41, 42 may pass through a packer (including a swell packer), cement or other annular sealing device.

It will also be appreciated that in at least some cases features of the present systems and apparatus may have distributed form. Thus say, for example, the harvesting module may be provided in a plurality of separate parts, components, or sub-modules that may be differently located.

Figure 6:
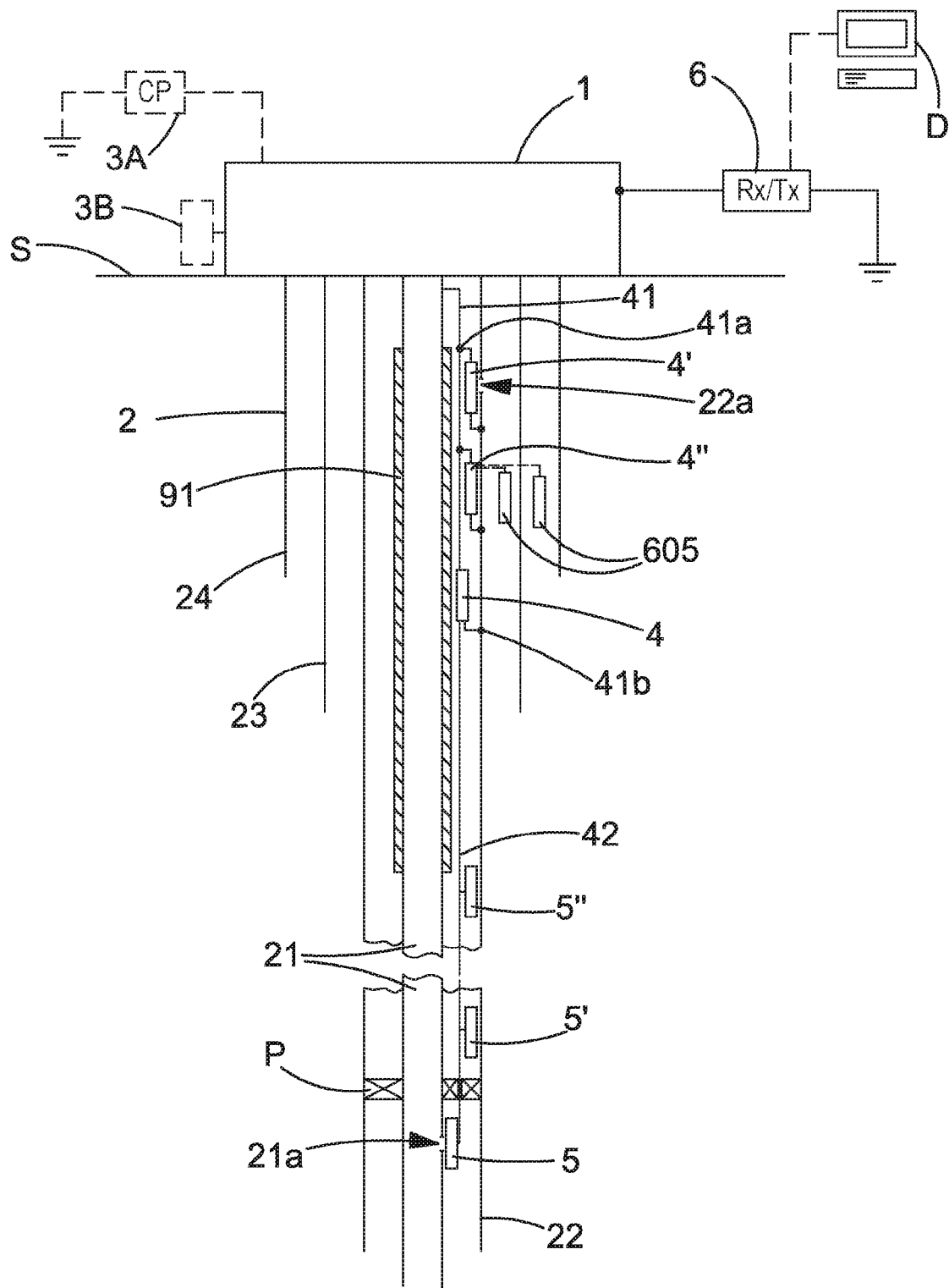
FIG. 6 schematically shows an alternative well installation.

FIG. 6 shows an alternative well installation which has similarity with the installation shown in FIG. 1 and the same reference numerals are used to indicate the features in common with the embodiment of FIG. 1 and detailed description of these common features is omitted.

The well installation shown in FIG. 6 helps to illustrate in more detail some of the alternatives described above in relation to each of the well installations shown in and described with reference to FIGS. 1 to 5.

The well installation includes monitoring apparatus in the same way as FIG. 1. Thus there is a harvesting module 4 connected via cables 41 to a pair of spaced locations 41*a* and 41*b*. However, in this case a first of the locations 41*a* is on the production tubing 21 and thus a first of the cables 41 is connected to the production tubing whilst the second of the spaced locations 41*b* is on the casing 22. Thus there is both axial and radial spacing between the connections 41*a*, 41*b* in this embodiment and thus the harvesting module 4 is connected across the "A" annulus. Furthermore, insulation 91 is provided on the production tubing 21 in the region of the second connection 41*b* and extends axially either side of this. Note that in another alternative, one connection might be to the formation rather than to the metallic structure. In some cases all of the apparatus of the power delivery system could be provided outside of the casing—i.e. between the casing and formation. This will generally be undesirable from a risk/difficulty in installation point of view, but is a possibility.

Further, in the present embodiment there are second and third harvesting modules 4' and 4" (which are part of respective downhole units) provided in the "A" annulus. In this embodiment each of these other harvesting modules 4', 4" makes use of the same first cable 41 and as such one terminal of each of the harvesting modules 4', 4" is connected to the first connection point 41*a*.

Note that in other embodiments separate cables could be used for making these connections to the first connection point and this would be preferable leading to improved performance. A single upper cable, as shown, whilst possible is unlikely to be used, but helps simplify the drawing. In some cases a plurality of harvesting modules may be provided which are distributed across different annuli.

In the present embodiment the first harvesting module 4 is connected via a secondary cable 42 to a downhole gauge 5 similarly to the embodiments shown in FIG. 1. However, here the downhole gauge 5 is located below a packer P and the cable 42 passes therethrough. The gauge 5 in this case is arranged for taking pressure and/or temperature measurements of conditions inside the production tubing 21 through a port 21*a* provided in the wall of the production tubing 21. That is to say although the downhole gauge 5 is provided in the "A" annulus it is arranged for measuring parameters within the production tubing 21.

Further, in this embodiment second and third downhole gauges 5' and 5" are provided. In this embodiment each of the downhole gauges 5, 5', 5" is connected to the harvesting module 4 via the same secondary cable 42. Thus this is a multi-drop system and the cable 42 is used for carrying power signals, control signals, parameter data and addressing data to allow powering of each of the gauges 5, 5', 5" as well as extracting readings therefrom.

Note that in alternative embodiments a number of downhole gauges or other downhole devices may be powered from one harvesting module 4 via individual dedicated cables 42 rather than a single cable as in the present embodiment. Further, as alluded to above, whilst in the present embodiment there are a plurality of gauges which are run off one harvesting module, in other embodiments one harvesting module may be used for powering different types of downhole device. Thus one harvesting module, for example, might be used to power a downhole gauge, a downhole repeater and a downhole valve.

In the present embodiment the second harvesting module 4' is part of a downhole tool which comprises both a harvesting module and a sensor. In the present case the sensor is arranged for measuring parameters in the "B" annulus via a port 22*a* provided in the first casing 22. Thus, for example, the sensor in the second harvesting module 4' may be arranged from measuring pressure and/or temperature in the "B" annulus.

Furthermore, in the present embodiment the third harvesting module 4" is again part of a downhole tool comprising, in this case, the harvesting module and a communication unit for communicating with sensors 605 provided in the "B" annulus and the "C" annulus. Here, communication between the sensors 605 and the second harvesting module 4" is via wireless means. Thus, for example, there may be inductive signalling or acoustic signalling between the sensors 605 and the harvesting module 4". The sensors 605 may be placed physically as close as possible to the harvesting module 4".

It will be appreciated that once data is at the upper communications unit 6, it may be transmitted onwards to any desired location using standard communication techniques such as mobile communication techniques, the internet and so on to a desk location D for further processing and/or review. Of course wired connections might also be provided between the desk location and the upper communication unit 6.

Furthermore, data may also be sent from the desk location D to the upper communication unit 6 for transmission downhole. Thus, for example, control signals may be transmitted from a desk location D via the upper communications unit 6 downhole to control operation of a harvesting module or sensor or downhole valve or repeater or so on and similarly any desired data may be sent in this fashion downhole.

In a further alternative, insulation may be provided on the outside of the outermost casing, for example, the third casing 24 in the embodiment shown in FIG. 6 in the region near the well head 1. This can help drive the maximum negative potential caused by the cathodic protection currents further down into the well. This is by virtue of minimising the leakage in this region near the well head. Thus providing insulation on the outermost casing can help allow the uppermost connection 41*a* to be positioned lower in the well without significantly reducing the effectiveness of the system. If one considers the potential decay curve, then by providing insulation on the outermost casing 24, the negative potential will decay very slowly in the insulated region near the well head and then begin to decay more quickly once the uninsulated region has been reached.

Figure 7:
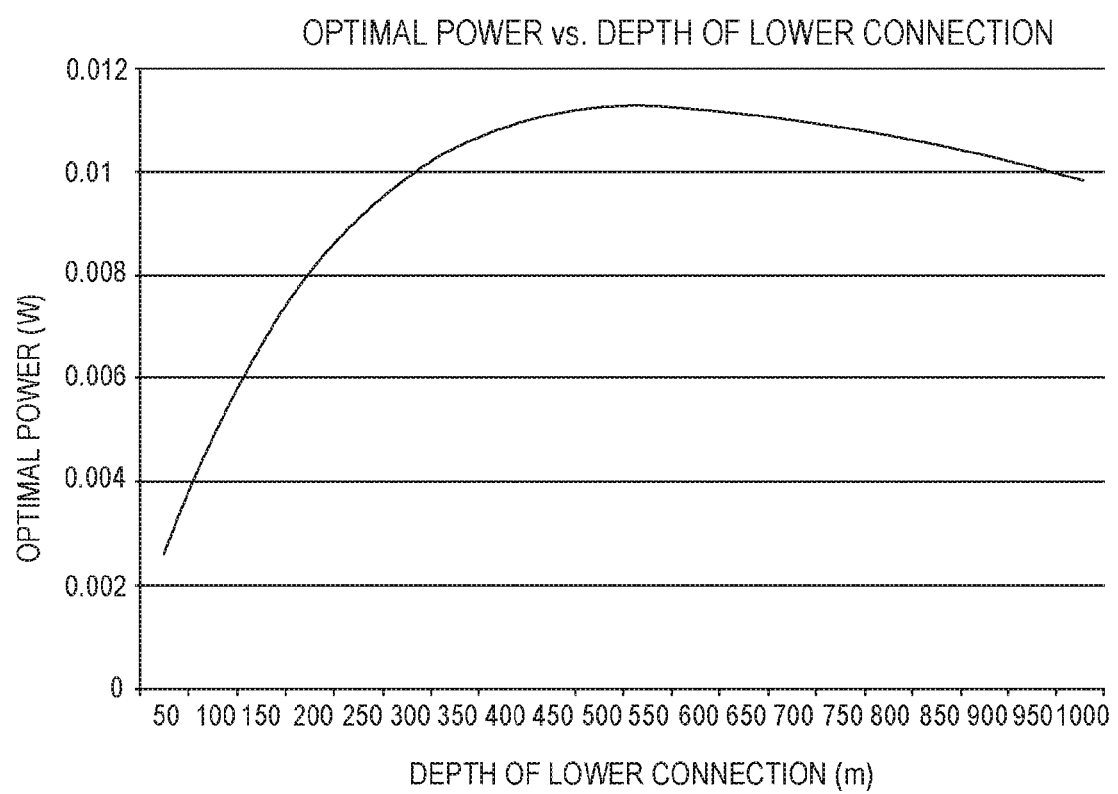
FIG. 7 shows a plot of optimal harvestable power against depth of a lower connection for an arrangement of the type shown in FIG. 1.

FIG. 7 is a plot showing an example of how the optimal power available for harvesting in a well installation varies with depth in the well. As mentioned above, due to the increase in potential difference which is available as the spacing between the connection increases on the one hand and the resistance of the cable on the other hand, there tends to be an optimum depth for the lower connection 41b, or to put this another way an optimum spacing between the two connections 41a and 41b. The plot shown in FIG. 7 relates to a position where the upper connection 41a is approximately 5 metres below the well head and thus in the region of the liner hanger. In this example it can be seen that the optimum depth of the lower connection is in the order of 550 metres down in the well. However, it can also be seen that a significant proportion of the optimum power can be obtained at depths between say 300 and 950 metres. In general terms it would be desirable to minimise the length of the cable whilst achieving an optimum power harvesting suggesting minimising the depth of the second connection. However there may be some circumstances where advantage of the fact that the harvesting module may be placed deeper in the well can be taken.

The optimal location for the upper connection may depend on the where the CP current (or other current) is injected and where the current is a maximum, or the potential caused by the current is a maximum. The present methods and systems may include steps of first determining where the applied current (or potential) has maximum magnitude and choosing the location for the upper connection in dependence on this.

Where the well is a land well the upper connection may be within 100 m of the surface, preferably within 50 m.

Where the well is a subsea well the upper connection may be within 100 m of the mudline, preferably within 50 m.

As mentioned above, whilst the above description refers to harvesting from cathodic protection currents and this is preferred, if other currents are present in the metallic structure, they may be equally used.

It will be appreciated that whilst particular examples are given above, in general any of the components of the system may be provided in any available annuli.

Where mention is made above of optimisation by modelling for example in relation to the spacing of connections, use of insulation, choice of radial only spacing or axial, and the selection of a pre-set harvesting load, at least one of the following parameters maybe used in the model:

1. Attenuation rate at the top of the well derived from casing and tubular dimensions, weights, and material type (resistivity) type and the resistivity of the overburden (medium surrounding the well).
2. Upper connection location.
3. Lower connection location.
4. Cross Sectional Area and material (resistivity) type of the upper cable used on inputs to the harvester.
5. Number, location, material (electro-potential) and surface area of the wellhead anodes.
6. Effective resistance of the well seen from the seabed/wellhead, again derived from casing and tubular dimensions, weights, and material type (resistivity) and resistivity of the overburden (medium surrounding the well) but this time for the whole completion.

In, particular examples of the above systems, the cable or cables 41 used in connecting the harvesting module to the structure/surroundings may have a cross-sectional area of say 10 mm$^2$ to 140 mm$^2$. 10 mm$^2$ might be considered a low end of a desired operational cable size. Larger cross-sectional area would normally be preferable. A 140 mm$^2$ cable might be Kerite® LTF3 flat type cable. This represents the upper end of what is currently commercially available, but, if available, larger sizes can be used.

Figure 8:
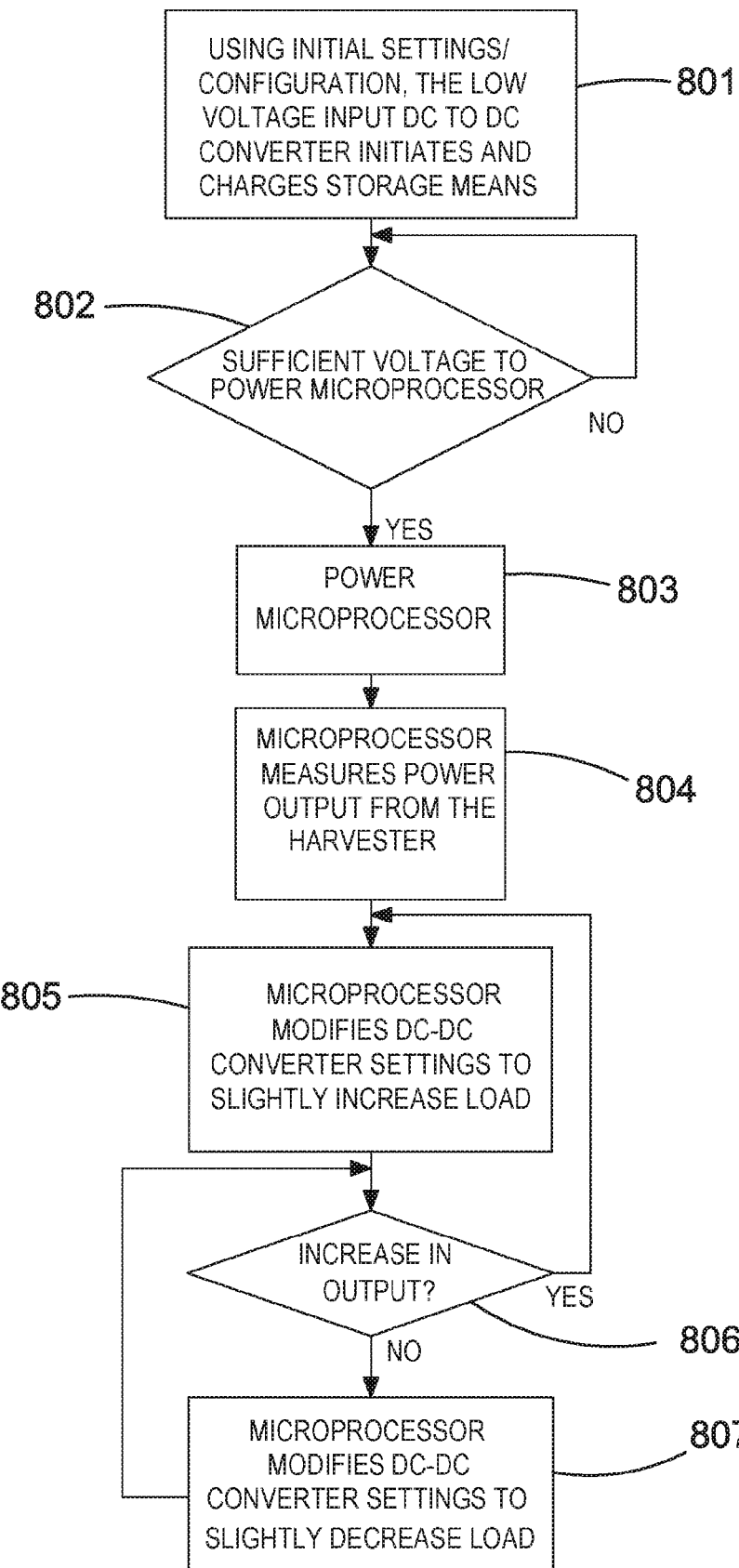
FIG. 8 shows a flow chart of energy harvesting optimisation.

FIG. 8 is a flow chart showing a process for optimising the energy harvesting of a harvesting module of the type described above.

In step 801 the dc to dc convertor 44 initiates using initial settings/configuration and delivers available energy to the charge storage means 45.

In step 802 a determination is made as to whether there is sufficient voltage to power the microprocessor in the central unit 46. If no, this step 802 repeats until the answer is yes and when the answer is yes, the process proceeds to step 803 where the microprocessor in the central unit 46 is powered.

Then in step 804 the microprocessor measures the power output from the energy harvester and in step 805 the microprocessor modifies the dc to dc convertor 44 settings to slightly increase load. Subsequently in step 806, a determination is made as to whether this leads to an increase in harvester output. If the answer is yes then the process returns to before step 805 so that the dc to dc convertor 44 settings can be altered again to slightly increase load.

On the other hand if the determination is made in step 806 that output was not increased then the process proceeds to step 807 where the microprocessor modifies the dc to dc convertor 44 settings to slightly decrease the load and the process returns to before step 806 so it can be determined whether this has resulted in an increase in output.

After this, steps 805, 806 and 807 are repeated iteratively during energy harvesting such that the load is successively incremented and decremented based on the result in step 806. Thus this leads to dynamic optimisation of power harvesting.

As mentioned above where the dc to dc convertor 44 makes use of a Field Effect Transistor and an accompanying transformer the step of changing the dc to dc convertor settings in steps 805 and 807 may comprise the step of changing the tapping used on the secondary transformer in order to modify the load appropriately. This will also be true where such a variable transformer is provided with a H-bridge as shown in FIG. 2D. Alternatively in such a case the duty cycle of the transistors in the H-bridge may be adjusted to vary the load.

Figure 9:
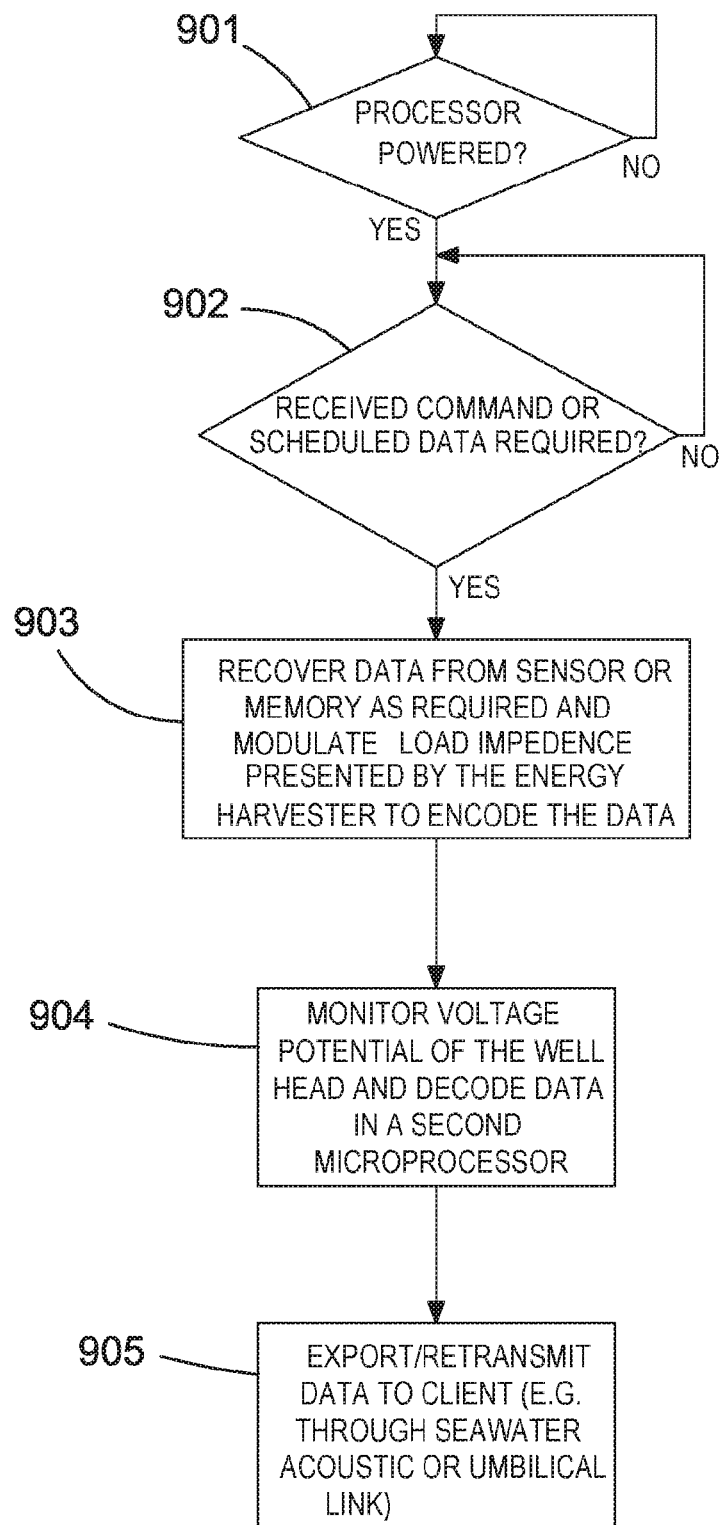
FIG. 9 shows a flow chart of operation of a downhole unit.

FIG. 9 shows a flow chart illustrating operation of a downhole unit 4a of the type described above.

In step 901 it is determined whether there is sufficient power to power the processor in the central unit 46. If not the process stays at this step until there is sufficient power.

When there is sufficient power, the process proceeds to step 902 where it is determined whether a command has been received or there is a requirement to send a scheduled set of data. If not then the process remains in this state of determining whether any action is required until action is required.

When action is required, the process proceeds to step 903 where data is recovered from a sensor or from memory as required and the load presented by the energy harvester module between the connections 41a is modulated to encode data.

Separately at the wellhead, in step 904, the voltage potential of the well head is monitored and data is decoded in a second microprocessor. Then in step 905 the extracted data may be exported or retransmitted to a client e.g. through a seawater acoustic link or an umbilical link.

Figure 10:
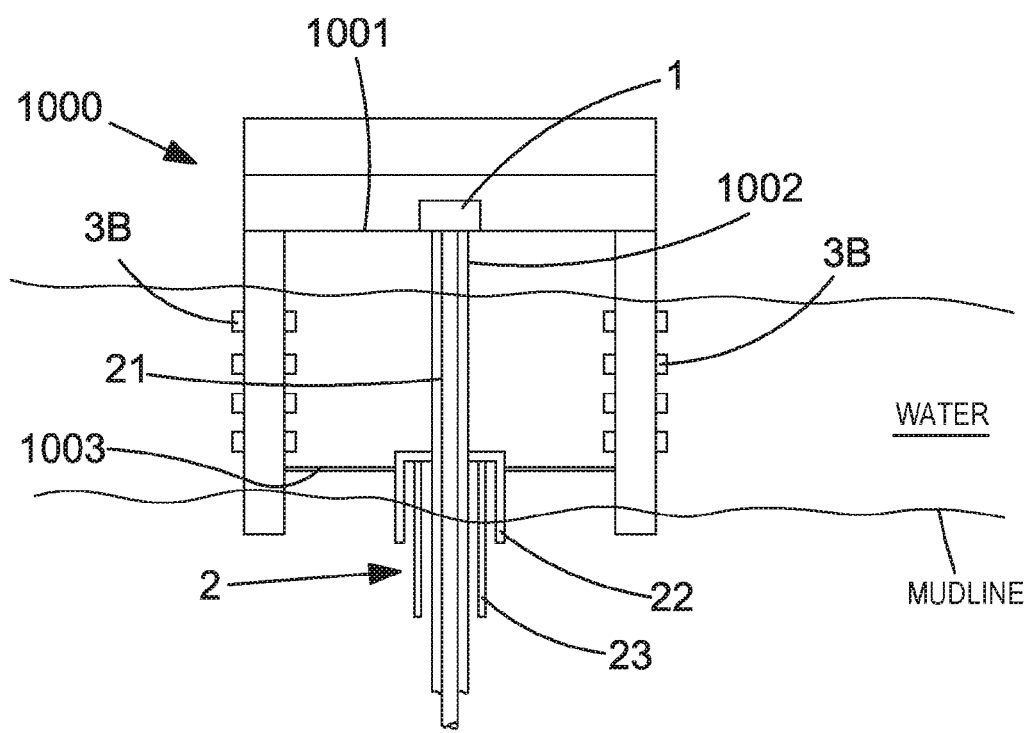
FIG. 10 schematically shows a well installation including a platform.

FIG. 10 shows a well installation including a platform 1000. The well head 1 is provided on a deck 1001 of the platform 1000. In this case the metallic structure includes a riser 1002 between the mudline and the deck 1001. The production tubing 21 runs within the riser 1002 as well as downhole. Casing 22, 23, is provided downhole. The innermost casing 22 is a continuation of the riser 1002. Cathodic protection anodes 3B are provided on the platform structure 1000. Electrical connection will exist between the platform and the downhole structure 2 (casing and production tubing). This may be via a drilling template 1003 and/or via the well head, riser and other components such as riser guides. In such cases it can be difficult to know where to make the upper connection of a harvesting arrangement of the type shown in FIG. 1, 3, 4 or 6 to gain best performance. It will not always be known where the cathodic protection current will be injected in to the conductive pipe (the runs of elongate members) which run down into the well. As mentioned above it can be desirable to make the upper connection adjacent the location where the CP current is injected. If one is looking for optimisation, one option is to control this injection point—i.e. ensure galvanic connection at a known point. Another option is to provide the system with a plurality of alternative upper connection points for the harvesting module and allow selection of the most effective connection point after installation. Typically in such a case, the power delivery system will be installed with a plurality of upper cable connections to the metallic structure and the best performing one selected, by, for example, operation of a switch under control of the central unit.

Signal, Device and Sensor Options

Various particular signalling techniques are described above. For the avoidance of doubt it should be noted that a wide range of signalling techniques may be used alone or in combination in various parts of the signal channel in systems of the current type. Thus wireless signals may be transmitted in at least one of the following forms: electromagnetic, acoustic, inductively coupled tubulars and coded pressure pulsing and references herein to "wireless", relate to said forms, unless where stated otherwise.

Signals, unless otherwise stated can include control and data signals. Control signals can control downhole devices including sensors. Data from sensors may be transmitted in response to a control signal. Moreover data acquisition and/or transmission parameters, such as acquisition and/or transmission rate or resolution, may be varied using suitable control signals.

Pressure pulses include methods of communicating from/to within the well/borehole, from/to at least one of a further location within the well/borehole, and the surface of the well/borehole, using positive and/or negative pressure changes, and/or flow rate changes of a fluid in a tubular and/or annular space.

Coded pressure pulses are such pressure pulses where a modulation scheme has been used to encode commands and/or data within the pressure or flow rate variations and a transducer is used within the well/borehole to detect and/or generate the variations, and/or an electronic system is used within the well/borehole to encode and/or decode commands and/or the data. Therefore, pressure pulses used with an in-well/borehole electronic interface are herein defined as coded pressure pulses. An advantage of coded pressure pulses, as defined herein, is that they can be sent to electronic interfaces and may provide greater transmission rate and/or bandwidth than pressure pulses sent to mechanical interfaces.

Where coded pressure pulses are used to transmit control signals, various modulation schemes may be used to encode control signals such as a pressure change or rate of pressure change, on/off keyed (OOK), pulse position modulation (PPM), pulse width modulation (PWM), frequency shift keying (FSK), pressure shift keying (PSK), amplitude shift keying (ASK), combinations of modulation schemes may also be used, for example, OOK-PPM-PWM. Transmission rates for coded pressure modulation schemes are generally low, typically less than 10 bps, and may be less than 0.1 bps.

Coded pressure pulses can be induced in static or flowing fluids and may be detected by directly or indirectly measuring changes in pressure and/or flow rate. Fluids include liquids, gasses and multiphase fluids, and may be static control fluids, and/or fluids being produced from or injected in to the well.

Wireless signals may be such that they are capable of passing through a barrier, such as a plug or said annular sealing device, when fixed in place. Therefore wireless signals may be transmitted in at least one of the following forms: electromagnetic, acoustic, and inductively coupled tubulars.

EM/Acoustic and coded pressure pulsing use the well, borehole or formation as the medium of transmission. The EM/acoustic or pressure signal may be sent from the well, or from the surface. If provided in the well, an EM/acoustic signal may be able to travel through any annular sealing device, although for certain embodiments, it may travel indirectly, for example around any annular sealing device.

Electromagnetic and acoustic signals are useful as they can transmit through/past an annular sealing device without special inductively coupled tubulars infrastructure, and for data transmission, the amount of information that can be transmitted is normally higher compared to coded pressure pulsing, especially receiving data from the well.

Where inductively coupled tubulars are used, there are normally at least ten, usually many more, individual lengths of inductively coupled tubular which are joined together in use, to form a string of inductively coupled tubulars. They have an integral wire and may be formed tubulars such as tubing, drill pipe, or casing. At each connection between adjacent lengths there is an inductive coupling. The inductively coupled tubulars that may be used can be provided by N O V under the brand Intellipipe®.

Thus, EM/acoustic or pressure wireless signals can be conveyed a relatively long distance as wireless signals, sent for at least 200 m, optionally more than 400 m or longer which is a clear benefit over other short range signals. Inductively coupled tubulars provide this advantage/effect by the combination of the integral wire and the inductive couplings. The distance travelled may be much longer, depending on the length of the well.

Data and commands within signals may be relayed or transmitted by other means. Thus the wireless signals could be converted to other types of wireless or wired signals, and optionally relayed, by the same or by other means, such as hydraulic, electrical and fibre optic lines. For example signals may be transmitted through a cable for a first distance, such as over 400 m, and then transmitted via acoustic or EM communications for a smaller distance, such as 200 m. In another example they may be transmitted for 500 m using coded pressure pulsing and then 1000 m using a hydraulic line.

Non-wireless means may be used to transmit the signal in addition to the wireless means. The distance travelled by signals is dependent on the depth of the well, often the wireless signal, including repeaters but not including any non-wireless transmission, travel for more than 1000 m or more than 2000 m.

Different wireless signals may be used in the same well for communications going from the well towards the surface, and for communications going from the surface into the well.

Wireless signals may be sent to a communication device, directly or indirectly, for example making use of in-well relays above and/or below any annular sealing device. A wireless signal may be sent from the surface or from a wireline/coiled tubing (or tractor) run probe at any point in the well optionally above any annular sealing device.

Acoustic signals and communication may include transmission through vibration of the structure of the well including tubulars, casing, liner, drill pipe, drill collars, tubing, coil tubing, sucker rod, downhole tools; transmission via fluid (including through gas), including transmission through fluids in uncased sections of the well, within tubulars, and within annular spaces; transmission through static or flowing fluids; mechanical transmission through wireline, slickline or coiled rod; transmission through the earth; transmission through wellhead equipment. Communication through the structure and/or through the fluid are preferred.

Acoustic transmission may be at sub-sonic (<20 Hz), sonic (20 Hz-20 kHz), and ultrasonic frequencies (20 kHz-2 MHz). Preferably the acoustic transmission is sonic (20 Hz-20 khz).

Acoustic signals and communications may include Frequency Shift Keying (FSK) and/or Phase Shift Keying (PSK) modulation methods, and/or more advanced derivatives of these methods, such as Quadrature Phase Shift Keying (QPSK) or Quadrature Amplitude Modulation (QAM), and preferably incorporating Spread Spectrum Techniques. Typically they are adapted to automatically tune acoustic signalling frequencies and methods to suit well conditions.

Acoustic signals and communications may be uni-directional or bi-directional. Piezoelectric, moving coil transducer or magnetostrictive transducers may be used to send and/or receive the signal.

Electromagnetic (EM) (sometimes referred to as Quasi-Static (QS)) wireless communication is normally in the frequency bands of: (selected based on propagation characteristics)

sub-ELF (extremely low frequency)<3 Hz (normally above 0.01 Hz),
ELF 3 Hz to 30 Hz;
SLF (super low frequency) 30 Hz to 300 Hz;
ULF (ultra low frequency) 300 Hz to 3 kHz; and,
VLF (very low frequency) 3 kHz to 30 kHz.

An exception to the above frequencies is EM communication using the pipe as a wave guide, particularly, but not exclusively when the pipe is gas filled, in which case frequencies from 30 kHz to 30 GHz may typically be used dependent on the pipe size, the fluid in the pipe, and the range of communication. The fluid in the pipe is preferably non-conductive. U.S. Pat. No. 5,831,549 describes a telemetry system involving gigahertz transmission in a gas filled tubular waveguide.

Sub-ELF and/or ELF are useful for communications from a well to the surface (e.g. over a distance of above 100 m). For more local communications, for example less than 10 m, VLF is useful. The nomenclature used for these ranges is defined by the International Telecommunication Union (ITU). EM communications may include transmitting communication by one or more of the following: imposing a modulated current on an elongate member and using the earth as return; transmitting current in one tubular and providing a return path in a second tubular; use of a second well as part of a current path; near-field or far-field transmission; creating a current loop within a portion of the well metalwork in order to create a potential difference between the metalwork and earth; use of spaced contacts to create an electric dipole transmitter; use of a toroidal transformer to impose current in the well metalwork; use of an insulating sub; a coil antenna to create a modulated time varying magnetic field for local or through formation transmission; transmission within the well casing; use of the elongate member and earth as a coaxial transmission line; use of a tubular as a wave guide; transmission without the well casing.

Especially useful is imposing a modulated current on an elongate member and using the earth as return; creating a current loop within a portion of the well metalwork in order to create a potential difference between the metalwork and earth; use of spaced contacts to create an electric dipole transmitter; and use of a toroidal transformer to impose current in the well metalwork.

To control and direct current advantageously, a number of different techniques may be used. For example one or more of: use of an insulating coating or spacers on well tubulars; selection of well control fluids or cements within or without tubulars to electrically conduct with or insulate tubulars; use of a toroid of high magnetic permeability to create inductance and hence an impedance; use of an insulated wire, cable or insulated elongate conductor for part of the transmission path or antenna; use of a tubular as a circular waveguide, using SHF (3 GHz to 30 GHz) and UHF (300 MHz to 3 GHz) frequency bands.

Various means for receiving a transmitted signal can be used, these may include detection of a current flow; detection of a potential difference; use of a dipole antenna; use of a coil antenna; use of a toroidal transformer; use of a Hall effect or similar magnetic field detector; use of sections of the well metalwork as part of a dipole antenna.

Where the phrase "elongate member" is used, for the purposes of EM transmission, this could also mean any elongate electrical conductor including: liner; casing; tubing or tubular; coil tubing; sucker rod; wireline; drill pipe; slickline or coiled rod.

Gauges can comprise one or more of various different types of sensor. The or each sensor can be coupled (physically or wirelessly) to a wireless transmitter and data can be transmitted from the wireless transmitter to above the annular sealing device or otherwise towards the surface. Data can be transmitted in at least one of the following forms: electromagnetic, acoustic and inductively coupled tubulars, especially acoustic and/or electromagnetic as described herein above.

Such short range wireless coupling may be facilitated by EM communication in the VLF range.

The sensors provided may sense any parameter and so be any type of sensor including but not necessarily limited to, such as temperature, acceleration, vibration, torque, movement, motion, cement integrity, pressure, direction and inclination, load, various tubular/casing angles, corrosion and erosion, radiation, noise, magnetism, seismic movements, stresses and strains on tubular/casings including twisting, shearing, compressions, expansion, buckling and any form of deformation; chemical or radioactive tracer detection; fluid identification such as gas detection; water detection, carbon dioxide detection, hydrate, wax and sand production; and fluid properties such as (but not limited to) flow, density, water cut, resistivity, pH, viscosity, bubble point, gas/oil ratio, hydrocarbon composition, fluid colour or fluorescence. The sensors may be imaging, mapping and/or scanning devices such as, but not limited to, camera, video, infra-red, magnetic resonance, acoustic, ultra-sound, electrical, optical, impedance and capacitance. Sensors may also monitor equipment in the well, for example valve position, or motor rotation. Furthermore the sensors may be adapted to induce the signal or parameter detected by the incorporation of suitable transmitters and mechanisms.

The apparatus especially the sensors, may comprise a memory device which can store data for recovery at a later time. The memory device may also, in certain circumstances, be retrieved and data recovered after retrieval.

The memory device may be configured to store information for at least one minute, optionally at least one hour, more optionally at least one week, preferably at least one month, more preferably at least one year or more than five years.

The invention claimed is:

1. A downhole data communication and electrical power harvesting apparatus for use in a well installation having metallic structure provided with a cathodic protection system such that there is an electrical circuit comprising the metallic structure and an earth return around which an electrical current flows as a result of the cathodic protection system, the downhole data communication and electrical power harvesting apparatus comprising:
    a first communication module for location at a first location downhole and being configured for modulating the cathodic protection electrical current at a first location so as to encode data;
    a second communication module for location at a second location, spaced from the first location, and comprising a detector for detecting the effect of the modulation of the cathodic protection electrical current at the first location so as to extract said data; and
    a downhole electrical power harvesting module arranged for electrical connection between a pair of spaced locations in the well installation and comprising an electrical circuit comprising a dc to dc convertor and being arranged for harvesting electrical energy, in use, from a potential difference between the pair of spaced locations caused by the cathodic protection electrical current, which potential difference acts as an input voltage to the dc to dc convertor, the harvesting module being arranged for supplying power to the first communication module, and
    the first communication module being arranged for controlling a load generated by the harvesting module to cause said modulation of the electric current in the metallic structure at said first location.

2. The downhole data communication and electrical power harvesting apparatus according to claim 1, in which the first communication module is further configured to at least one of:
    i) where the cathodic protection system is an impressed cathodic protection system, control a signal source of the impressed cathodic protection system to directly modulate the cathodic protection current applied to the metallic structure;
    ii) modify the connection between at least one anode of the cathodic protection system and the metallic structure; and
    iii) alter an impedance of the electrical circuit.

3. The downhole data communication and electrical power harvesting apparatus according to claim 1, wherein the second communication module is arranged for location downhole.

4. The downhole data communication and electrical power harvesting apparatus according to claim 1, further comprising a sensor module for sensing at least one parameter, wherein the first communication module is arranged for sending data encoding readings from the sensor module towards the second communication module.

5. The downhole data communication and electrical power harvesting apparatus according to claim 4, wherein the sensor module comprises a pressure sensor.

6. The downhole data communication and electrical power harvesting apparatus according to claim 1, wherein the second communication module is arranged for providing second data to a downhole device in dependence on first data received by the second communication module from the first communication module.

7. The downhole data communication and electrical power harvesting apparatus according to claim 6, wherein the downhole device comprises at least one of:
    a downhole sensor;
    a downhole actuator;
    an annular sealing device;
    a valve; and
    a downhole communication module.

8. The downhole data communication and electrical power harvesting apparatus according to claim 7, wherein the downhole device comprises the valve and the valve comprises at least one of:
    a subsurface safety valve;
    a bore flow control valve;
    a bore to annulus valve;
    an annulus to annulus valve;
    a bore to pressure compensation chamber valve;
    an annulus to pressure compensation chamber valve; and
    a through packer or packer bypass valve.

9. The downhole data communication and electrical power harvesting apparatus according to claim 1, wherein at least one of the first and second communication modules comprises a communications repeater for location downhole in a well and arranged for communicating with a first device beyond a the well head of the well using a communication channel which is wireless at least through the well head and arranged for communicating with a second device located in the well and thus below the well head such that the communications repeater being operable as a repeater between the first and second devices, the first device being on an opposite side of the well head than the second device.

10. The downhole data communication and electrical power harvesting apparatus according to claim 1, wherein the harvesting module is arranged to harvest electrical energy from dc currents.

11. A downhole data communication and electrical power harvesting system comprising the downhole data communication and electrical power harvesting apparatus according to claim 1, located in a well installation having metallic structure provided with a cathodic protection.

12. The downhole data communication and electrical power harvesting system according to claim 11, wherein the well is a subsea well.

13. The downhole data communication and electrical power harvesting system according to claim 11, wherein the current flow within portions of the metallic structure in regions between the spaced locations, used for harvesting, is in the same longitudinal direction.

14. The downhole data communication and electrical power harvesting system according to claim 11, wherein there is an uninterrupted current flow path between the spaced locations, used for harvesting, which is at least partly via the metallic structure.

15. The downhole data communication and electrical power harvesting system according to claim 11, wherein at least one of the first communication module and the second communication module is located in an enclosed annulus of the well.

16. The downhole data communication and electrical power harvesting system according to claim 11, comprising a pressure sensor arranged for monitoring a reservoir pressure of the well.

17. The downhole data communication and electrical power harvesting system according to claim 11, comprising a pressure sensor arranged for monitoring the pressure in an annulus of the well.

18. The downhole data communication and electrical power harvesting system according to claim 11, comprising a pressure sensor arranged for monitoring the pressure in an enclosed annulus of the well.

19. The downhole communication and electrical power harvesting apparatus according to claim 7, wherein the downhole device comprises a downhole communication module which is one of a transceiver and a repeater.

20. The downhole communication and electrical power harvesting apparatus according to claim 7, wherein the downhole device comprises an annular sealing device which is one of a packer and a packer element.

21. A communication and electrical power harvesting enabled downhole well installation comprising:
a downhole metallic structure provided with a cathodic protection system, such that there is an electrical circuit comprising the metallic structure and an earth return around which a cathodic protection electrical current flows as a result of the cathodic protection system, and
a downhole data communication and electrical power harvesting apparatus according to claim 1, with the first communication module provided downhole in the well installation and arranged for modulating said cathodic protection electrical current which flows as a result of the cathodic protection system.

22. A communication enabled downhole well installation comprising:
a downhole metallic structure provided with a cathodic protection system, such that there is an electrical circuit comprising the metallic structure and an earth return around which a cathodic protection electrical current flows as a result of the cathodic protection system, and
a downhole data communication apparatus, the downhole data communication apparatus comprising:
a first communication module located at a first location downhole in the well installation and being configured for modulating the cathodic protection electrical current at the first location so as to encode data; and
a second communication module located at a second location, spaced from the first location, and comprising a detector for detecting the effect of the modulation of the cathodic protection electrical current at the first location so as to extract said data.

23. A downhole data communication and electrical power harvesting apparatus for use in a well installation having metallic structure provided with a cathodic protection system such that there is an electrical circuit comprising the metallic structure and an earth return around which an electrical current flows as a result of the cathodic protection system, the downhole data communication and electrical power harvesting apparatus comprising:
a first communication module for location at a first location downhole and being configured for modulating the cathodic protection electrical current at a first location so as to encode data;
a second communication module for location at a second location, spaced from the first location, and comprising a detector for detecting the effect of the modulation of the cathodic protection electrical current at the first location so as to extract said data; and
a downhole electrical power harvesting module arranged for electrical connection between a pair of spaced locations in the well installation and comprising an electrical circuit comprising a dc to dc convertor and being arranged for harvesting electrical energy, in use, from a potential difference between the pair of spaced locations caused by the cathodic protection electrical current, which potential difference acts as an input voltage to the dc to dc convertor, the harvesting module being arranged for supplying power to the first communication module.

24. A communication and electrical power harvesting enabled downhole well installation comprising:
a downhole metallic structure provided with a cathodic protection system, such that there is an electrical circuit comprising the metallic structure and an earth return around which a cathodic protection electrical current flows as a result of the cathodic protection system, and
a downhole data communication apparatus incorporating metallic structure provided, the downhole data communication apparatus comprising:
a first communication module for location at a first location downhole and being configured for modulating the cathodic protection electrical current at a first location so as to encode data;
a second communication module for location at a second location, spaced from the first location, and comprising a detector for detecting the effect of the modulation of the cathodic protection electrical current at the first location so as to extract said data; and
a downhole electrical power harvesting module arranged for electrical connection between a pair of spaced locations in the well installation and comprising an electrical circuit arranged for harvesting electrical energy, in use, from a potential difference between the pair of spaced locations caused by the cathodic protection electrical current, which potential difference acts as an input voltage, the harvesting module being arranged for supplying power to the first communication module, and
the first communication module being arranged for controlling a load generated by the harvesting module to cause said modulation of the electric current in the metallic structure at said first location.

25. The downhole data communication and electrical power harvesting apparatus according to claim 1, wherein the dc to dc convertor comprises an output for supplying harvested power onwards from the dc to dc convertor for use outside of the dc to dc convertor.

26. The downhole data communication and electrical power harvesting apparatus according to claim 1, wherein the first communication unit is arranged for controlling a load generated by the dc to dc convertor in order to control the load generated by the harvesting module to cause said modulation of the electric current in the metallic structure at said first location.

27. A downhole data communication and electrical power harvesting apparatus for use in a well installation having metallic structure provided with a cathodic protection system such that there is an electrical circuit comprising the metallic structure and an earth return around which an electrical current flows as a result of the cathodic protection system, the downhole data communication apparatus comprising:

a first communication module for location at a first location downhole and being configured for modulating the cathodic protection electrical current at a first location so as to encode data;

a second communication module for location at a second location, spaced from the first location, and comprising a detector for detecting the effect of the modulation of the cathodic protection electrical current at the first location so as to extract said data; and a downhole electrical power harvesting module arranged for electrical connection between a pair of spaced locations in the well installation and comprising an electrical circuit arranged for harvesting electrical energy, in use, from a potential difference between the pair of spaced locations caused by the cathodic protection electrical current, which potential difference acts as an input voltage, the harvesting module being arranged for supplying power to the first communication module, and the first communication module being arranged for controlling a load generated by the harvesting module to cause said modulation of the electric current in the metallic structure at said first location and the first communication module being arranged to be operated using power harvested by the harvesting module when controlling the load generated by the harvesting module.

28. A downhole data communication and electrical power harvesting apparatus for use in a well installation having metallic structure provided with a cathodic protection system such that there is an electrical circuit comprising the metallic structure and an earth return around which an electrical current flows as a result of the cathodic protection system, the downhole data communication apparatus comprising:

a first communication module for location at a first location downhole and being configured for modulating the cathodic protection electrical current at a first location so as to encode data;

a second communication module for location at a second location, spaced from the first location, and comprising a detector for detecting the effect of the modulation of the cathodic protection electrical current at the first location so as to extract said data; and a downhole electrical power harvesting module arranged for electrical connection between a pair of spaced locations in the well installation and comprising an electrical circuit arranged for harvesting electrical energy, in use, from a potential difference between the pair of spaced locations caused by the cathodic protection electrical current, which potential difference acts as an input voltage, the harvesting module being arranged for supplying power to the first communication module, and the first communication module being arranged for controlling a load generated by the harvesting module to cause said modulation of the electric current in the metallic structure at said first location, wherein the harvesting module has an output for supplying power away from the metallic structure and is arranged for supplying power via the output to at least one component outside of the harvesting module, said at least one component outside of the harvesting module comprising at least one of:

i) a component of the first communication module; and ii) a component separate from the first communication module and separate from the metallic structure.

\* \* \* \* \*